United States Patent
Ravishankar et al.

(10) Patent No.: US 12,499,996 B2
(45) Date of Patent: Dec. 16, 2025

(54) MONITORING, PREDICTING AND ALERTING SHORT-TERM OXYGEN SUPPORT NEEDS FOR PATIENTS

(71) Applicants: GE Precision Healthcare LLC, Milwaukee, WI (US); MASS GENERAL BRIGHAM INCORPORATED, Boston, MA (US); The General Hospital Corporation, Boston, MA (US); The Brigham and Women's Hospital, Inc., Boston, MA (US)

(72) Inventors: Hariharan Ravishankar, Bengaluru (IN); Abhijit Patil, Bengaluru (IN); Rohit Pardasani, Bengaluru (IN); Dirk Johannes Varelmann, Newton, MA (US); Pankaj Sarin, Cambridge, MA (US); Marcio Aloisio Bezerra Cavalcanti Rockenbach, Boston, MA (US); Quanzheng Li, Belmont, MA (US)

(73) Assignees: GE PRECISION HEALTHCARE LLC, Waukesha, WI (US); MASS GENERAL BRIGHAM INCORPORATED(B), Boston, MA (US); The General Hospital Corporation, Boston, MA (US); The Brigham and Women's Hospital, Inc., Boston, MA (US)

( * ) Notice: Subject to any disclaimer, the term of this patent is extended or adjusted under 35 U.S.C. 154(b) by 308 days.

(21) Appl. No.: 17/559,282

(22) Filed: Dec. 22, 2021

(65) Prior Publication Data
US 2023/0031328 A1 Feb. 2, 2023

(30) Foreign Application Priority Data
Jul. 30, 2021 (IN) .......................... IN202141034305

(51) Int. Cl.
*G16H 50/20* (2018.01)
*A61M 16/00* (2006.01)
(Continued)

(52) U.S. Cl.
CPC ........ *G16H 50/20* (2018.01); *A61M 16/0003* (2014.02); *A61M 16/026* (2017.08);
(Continued)

(58) Field of Classification Search
CPC .............. G16H 50/20; A61M 16/0003; A61M 16/1005; A61M 16/026; A61M 2016/0033; G06N 20/00
See application file for complete search history.

(56) References Cited

U.S. PATENT DOCUMENTS 10,679,754 B2 * 6/2020 Johnson .................. G16H 50/30
2004/0122719 A1 * 6/2004 Sabol ................. G06Q 30/0204
705/7.29
(Continued)

FOREIGN PATENT DOCUMENTS

AU 2021102579 A4 * 7/2021
CN 112675393 A * 4/2021
(Continued)

OTHER PUBLICATIONS

Mehrotra, Sanjay, et al. A Model of Supply-Chain Decisions for Resource Sharing with an Application to Ventilator Allocation to Combat COVID-19. arXiv:2004.01318, arXiv, Apr. 2, 2020. arXiv. org, https://doi.org/10.48550/arXiv.2004.01318. (Year: 2020).*
(Continued)

*Primary Examiner* — Jason S Tiedeman
*Assistant Examiner* — Jonathan C Edouard
(74) *Attorney, Agent, or Firm* — Amin, Turocy & Watson, LLP

(57) ABSTRACT

Systems and techniques for monitoring, predicting and/or alerting for short-term oxygen support needs of patients are
(Continued)

FIG. 1 presented. A system can include a data collection component that receives multimodal patient data for a patient having a respiratory condition in association with monitoring and treating the respiratory condition in real-time, the multimodal patient data comprising at least physiological data regarding physiological parameters tracked for the patient over a period of time, and current oxygen support data regarding a current oxygen support mechanism of the patient. The system can further include an oxygen support forecasting component that processes the multimodal patient data using an oxygen support forecasting model to generate an output forecast that indicates whether a change to the current oxygen support mechanism is recommended for the patient within a defined upcoming timeframe.

20 Claims, 11 Drawing Sheets

(51) Int. Cl.
*A61M 16/10* (2006.01)
*G06N 20/00* (2019.01)
(52) U.S. Cl.
CPC ......... *A61M 16/1005* (2014.02); *G06N 20/00* (2019.01); *A61M 2016/0033* (2013.01)

(56) References Cited

U.S. PATENT DOCUMENTS

| | | | | |
|---|---|---|---|---|
| 2012/0000464 | A1* | 1/2012 | Gajic | A61B 5/085 |
| | | | | 128/202.22 |
| 2015/0106020 | A1* | 4/2015 | Chung | G16H 40/67 |
| | | | | 702/19 |
| 2015/0164433 | A1* | 6/2015 | Halperin | A61B 5/0823 |
| | | | | 600/300 |
| 2016/0193438 | A1* | 7/2016 | White | A61M 16/026 |
| | | | | 128/204.23 |
| 2018/0001042 | A1* | 1/2018 | Albanese | A61M 16/026 |
| 2018/0104426 | A1* | 4/2018 | Oldfield | A61M 16/024 |
| 2018/0107791 | A1* | 4/2018 | Guo | G06Q 40/08 |
| 2018/0129786 | A1* | 5/2018 | Khine | G16H 40/63 |
| 2018/0193579 | A1* | 7/2018 | Hanrahan | G16H 40/20 |
| 2018/0271454 | A1* | 9/2018 | Kramer | A61B 5/7405 |
| 2019/0143056 | A1* | 5/2019 | Steinhauer | A61M 16/026 |
| | | | | 128/204.23 |
| 2019/0371460 | A1* | 12/2019 | Gutierrez | A61M 16/026 |
| 2020/0160982 | A1* | 5/2020 | Gurson | G06N 3/045 |
| 2020/0383647 | A1* | 12/2020 | Freeman | A61B 5/7264 |
| 2021/0196916 | A1* | 7/2021 | Rauker | A61M 16/0672 |

FOREIGN PATENT DOCUMENTS

| | | | | |
|---|---|---|---|---|
| FR | 3025336 | A1 * | 3/2016 | ............ G16H 20/40 |
| WO | WO-2015157576 | A1 * | 10/2015 | ............ G06Q 10/06 |

OTHER PUBLICATIONS

CN-112675393-A—translated (Year: 2021).*
FR-3025336-A1_translated (Year: 2016).*
Cheng, Fu-Yuan et al. | "Using machine learning to predict ICU transfer in hospitalized COVID-19 patients." Journal of clinical medicine 9.6 (2020): 1668, 12 pages.
Li, Xiaoran et al. | "Deep learning prediction of likelihood of ICU admission and mortality in COVID-19 patients using clinical variables." PeerJ 8 (2020): e10337, 19 pages.
Goic, Marcel et al. | "COVID-19: Short-term forecast of ICU beds in times of crisis." PloS one 16.1 (2021): e0245272, 24 pages.
Bai, Xiang, et al. | "Predicting COVID-19 malignant progression with AI techniques." (2020), 26 pages.
Torjesen, I. | "Covid-19: When to start invasive ventilation is the million dollar question" BMJ 2021; 372 : n121 doi:10.1136/bmj. n121, 2 pages.

* cited by examiner

MONITORING, PREDICTING AND ALERTING SHORT-TERM OXYGEN SUPPORT NEEDS FOR PATIENTS

TECHNICAL FIELD

This disclosure relates generally to monitoring, predicting and/or short-term oxygen support needs for patients.

BACKGROUND

Starting in December 2019, a novel coronavirus, designated SARS-CoV-2 caused an international and rapidly growing pandemic of respiratory illness termed COVID-19 (also referred to as coronavirus disease). The full spectrum of COVID-19 ranges from a mild, self-limiting respiratory disease course to severe progressive pneumonia, multiorgan failure, and death. Healthcare systems around the world have become increasingly strained especially on available resources. The capacity of local and regional healthcare systems, and in particular the availability of emergency department (ED) and inpatient beds, may be insufficient during epidemic surge conditions. Among hospitalized patients, the presence and severity of respiratory failure are usually the most important clues in making the decision about admitting to the intensive care unit (ICU) in order to provide ventilatory support (non-invasive or invasive ventilation) or to treat on the regular ward.

To adequately manage the high volume of patient encounters and hospital admissions in the setting of exaggerated imbalances within critical resource availability, special considerations and unconventional measures must be entertained. Given our increasing knowledge of the somewhat unpredictable COVID-19 clinical progression, it is prudent to institute an active observation regimen to detect early signs of deterioration that can occur in patients throughout their treatment. As the current COVID-19 inpatient strategy relies heavily on managing oxygenation, there exists a strong demand for diligent and close monitoring of COVID-19 patients oxygen needs.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

According to an embodiment, a system includes a memory that stores computer executable components and a processor that executes the computer executable components stored in the memory. These compute executable components include a data collection component that receives multimodal patient data for a patient having a respiratory condition (e.g., COVID-19 or another respiratory illness or condition) in association with monitoring and treating the respiratory condition in real-time. The multimodal patient data comprises at least physiological data regarding physiological parameters tracked for the patient over a period of time, and current oxygen support data regarding a current oxygen support mechanism of the patient. The multimodal patient data may further include, but is not limited to, patient demographic data, patient comorbidities data, patient laboratory results data and patient chest imaging study reports data. The computer executable components further include an oxygen support forecasting component that processes the multimodal patient data using an oxygen support forecasting model to generate an output forecast that indicates whether a change to the current oxygen support mechanism is recommended for the patient within a defined upcoming timeframe.

In this regard, the data collection component can receive the multimodal patient data in real-time over a course of care of the patient and the oxygen support forecasting component processes the multimodal patient data repeatedly over the course of care to repeatedly generate updated output forecasts. The computer executable components can further comprise a notification component that generates a notification regarding the output forecast and provides the notification to one or more clinician devices using one or more electronic notification means.

In some implementations, the change is selected from the group consisting of, an addition of an oxygen support device, a removal of an oxygen support device, a device type change to different type of oxygen support device, and a flow rate change to a flow rate of a current oxygen support device used by the patient. Additionally, or alternatively, the output forecast can indicate whether the current oxygen support mechanism should be maintained, upgraded, or downgraded. The notification component may also be configured to generate an urgent notification regarding the output forecast in response to the output forecast indicating the current oxygen support mechanism should be upgraded or downgraded and provide the urgent notification to one or more clinician devices using one or more electronic notification means.

The oxygen support forecasting model can comprise one or more machine learning models trained on historical patient data for past patients having the respiratory condition or a similar respiratory condition. The computer executable components may further comprise a training component that trains the oxygen support forecasting model to generate the output forecast based on the historical patient data using one or more machine learning techniques.

The computer executable components may further comprise a rendering component that renders the patient data and the output forecast via a graphical user interface associated with a respiratory health monitoring application, and a feedback component that receives feedback via the respiratory health monitoring application regarding accuracy of the output forecast. In some embodiments, the computer executable components may further comprise a resource allocation component that determines an optimal allocation of available oxygen resources to patients based on their forecasted oxygen support needs.

In some embodiments, elements described in the disclosed systems can be embodied in different forms such as a computer-implemented method, a computer program product, or another form.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
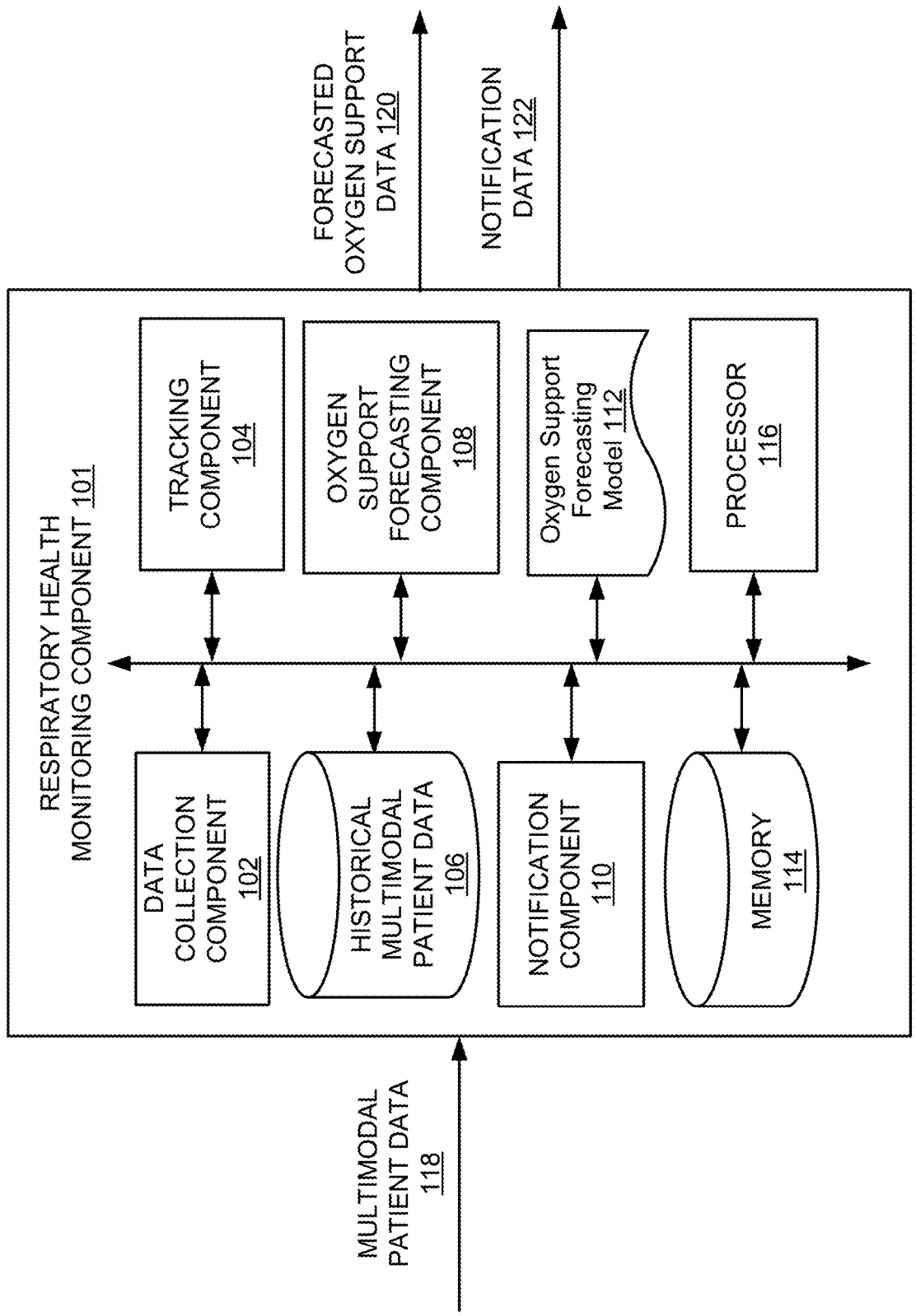
FIG. 1 illustrates a high-level block diagram of an example respiratory health monitoring component, in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate monitoring, predicting and alerting for respiratory illness patient short-term oxygen support needs. Various embodiments of the disclosed subject matter are demonstrated with respect to monitoring, predicting and alerting for short-term oxygen support needs of patients with COVID-19, particularly in the context of their course of inpatient care at a medical facility (e.g., a hospital or the like). However, the disclosed techniques can be applied in a variety of other clinical contexts for patients with other medical conditions/diagnosis (e.g., pneumonia, or respiratory distress) that may or may not need oxygen support.

The disclosed techniques employ principles of artificial intelligence (AI) and machine learning (ML) to forecast whether a change to the current oxygen support mechanism used by a respiratory illness patient is recommended before the need materializes (e.g., an hour before the expected change is needed or within another defined time frame). For example, the change can be based on the addition or removal of an oxygen support device, a change to different type of oxygen support device (e.g., a non-invasive device to invasive device, or vice versa), and/or a change to the flow rate of a current oxygen support device used by the patient.

To facilitate this end, an oxygen support forecasting model is developed that receives multimodal patient data as input, along with information identifying their current oxygen support mechanism (e.g., room air, a low-flow device, a high-flow device, a mechanical ventilation device, and the like), and outputs an oxygen support need forecast for the patient. The oxygen support need forecast can provide information that indicates whether the current oxygen support mechanism used by the patient should be upgraded (e.g., stepped up to a stronger support mechanism), downgraded (e.g., stepped down), or maintained. The oxygen support model can be or include one or more ML models that have been previously trained to predict when a patient should upgrade, downgrade or maintain their current oxygen support mechanism based on historical multimodal patient data for past patients with same or similar respiratory conditions. The multimodal patient data can include relevant physiological data (e.g., vitals) for the patient tracked and received in real-time over their course of care as well as various other clinical and non-clinical data associated with the patient that has been correlated to their oxygen support needs. For example, in addition to the physiological data, the multimodal patient data can include (but is not limited to), patient demographic data, patient comorbidities data, patient laboratory results data and patient chest imaging study reports data.

In various embodiments, a data collection component can receive the multimodal data for the patient from one or more clinical sources/system in association with their course of care (e.g., from admission to discharge, from admission to the ICU to return to the ward, or another period of care). For example, the data collection component may regularly and/or continuously receive physiological data (e.g., vitals) for the patient from one or more medical monitoring devices/systems associated with the patient. The physiological data can also include information regarding the current oxygen support mechanism employed by the patient. The data collection component may also receive laboratory results data and imaging study report data for the patient from corresponding laboratory reporting and imaging reporting systems when it becomes available (e.g., which may be once or multiple times over the course of the patient's care). A tracking component may further track this temporal patient data as it received overtime. The data collection component can also receive relevant information regarding the patient's demographic profile (e.g., age, weight, body mass index (BMI), ethnicity, location, smoking history, etc.), comorbidities, medical history, and other static data inputs, from one or more electronic health record (EHR) systems (or the like) at any point prior to application of the model (e.g., upon admission and/or in association with initiating monitoring of the patient's respiratory condition).

A forecasting component can apply the oxygen support forecasting model to the received/tracked multimodal patient data at one or more points throughout their course of care to forecast their upcoming oxygen support needs. For example, in some embodiments, the forecasting component can be configured to apply the forecasting model to the current set of tracked multimodal patient data according to a defined schedule, such as once every 30 minutes, once every hour, etc., to forecast whether they should upgrade, downgrade or maintain their current oxygen support mechanism in the next 30 minutes, the next hour, and so on. In other embodiments, the forecasting component can be configured to apply the oxygen support forecasting model based on reception of new multimodal data reflecting a new event or a change in the previously tracked patient data. For example, the new event may include a change in the patient's tracked vitals, newly received laboratory results, newly received imaging study results, and so on. The oxygen support forecasting model may further be continuously and/or regularly retrained using historical multimodal patient tracked and aggregated by the system over time to optimize model performance.

The oxygen support need forecasts generated by the model can be used to facilitate clinical decisions by individuals caring for the patients and optimize allocation of available oxygen support resources. In some embodiments, the forecast results can be presented to one or more clinicians in real-time via one or more display devices accessible to the clinicians. Additionally, or alternatively, a notification component can be configured to notify the clinicians (or another suitable entity) regarding the output forecasts generated by the model. For example, the notification component can be configured to generate and send electronic notifications to one or more devices accessible to the clinicians in response to generation of an output forecast and/or a particular forecast result (e.g., in response to a forecast indicating an upgrade or a downgrade is recommended). In some embodiments in which the system can forecast changes needed to oxygen device flow rates, the system may also be configured to automatically control and adjust the oxygen device flow rate (e.g., via wireless or wired flow rate control commands communicated to the oxygen device).

The term "multimodal data" is used herein to refer to two or more different types of data. The differentiation factor between the two or more different types of data can vary. For example, the differentiation factor can refer to the medium of the data (e.g., image data, text data, signal data, etc.), the format of the data, the capture modality of the data, the source of the data and so one. In the medical/clinical context, multimodal clinical refers to two or more forms of health-related information that is associated with patient care and/or part of a clinical trial program. Clinical data consist of information ranging from determinants of health and measures of health and health status to documentation of care delivery. Different types of clinical data are captured for a variety of purposes and stored in numerous databases across healthcare systems. Some example types of clinical data that may be included in a pool of multimodal clinical data from which a data cohort may be generated includes (but is not limited to): medical images and associated metadata (e.g., acquisition parameters), radiology reports, clinical laboratory data, patient EHR data, patient physiological data, pharmacy information, pathology reports, hospital admission data, discharge and transfer data, discharge summaries, and progress notes.

The term "clinical inferencing model" is used herein to refer to a ML model configured to perform a clinical decision/processing on clinical data. The clinical decision/processing task can vary. For example, the clinical decision/processing tasks can include classification tasks (e.g., disease classification/diagnosis), disease progression/quantification tasks, organ segmentation tasks, anomaly detection tasks, image reconstruction tasks, and so on. The clinical inferencing models can employ various types of ML algorithms, including (but not limited to): deep learning models, neural network models, deep neural network models (DNNs), convolutional neural network models (CNNs), generative adversarial neural network models (GANs), long short-term memory models (LSTMs), attention-based models, transformers and the like. The term "multimodal clinical inferencing model" is used herein to refer to a clinical inferencing model adapted to receive and process multimodal clinical data as input. Various embodiments of the disclosed subject matter are directed to an oxygen forecasting support model that can be or include a multimodal clinical inferencing model adapted to forecast short-term oxygen support needs for patients with a respiratory condition.

As used herein, a "medical imaging inferencing model" refers to an image inferencing model that is tailored to perform an image processing/analysis task on one or more medical images. For example, the medical imaging processing/analysis task can include (but is not limited to): disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

The types of medical images processed/analyzed by the medical image inferencing models described herein can include images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can also include synthetic versions of native medical images such as synthetic X-ray (SXR) images, modified or enhanced versions of native medical images, augmented versions of native medical images, and the like generated using one or more image processing techniques. The medical imaging processing models disclosed herein can also be configured to process 3D images.

The term "multimodal image data" refers to image data captured of the same subject and anatomical region with two or more different captured modalities and/or acquisition protocol. A "capture modality" as used herein refers to the specific technical mode in which an image or image data is captured using one or more machines or devices. For example, multimodal image data for a particular patient may include an XR imaging study and a CT imaging study captured of the same anatomical region of the patient. In this regard, as applied to medical imaging, different capture modalities can include but are not limited to: a 2D capture modality, a 3D capture modality, an RT capture modality, a XR capture modality, a DX capture modality, a XA capture modality, a PX capture modality a CT, a MG capture modality, a MRI capture modality, a US capture modality, a CD capture modality, a PET capture modality, a SPECT capture modality, a NM capture modality, and the like.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a high-level block diagram of an example respiratory health monitoring component 101, in accordance with one or more embodiments described herein. The respiratory health monitoring component 101 can be implemented on or in connection with a network of servers associated with an enterprise application (e.g., an enterprise network of connected machines). The respiratory health monitoring component 101 can be employed by various systems, such as, but not limited to healthcare systems, medical systems, hospital systems, medical device systems, electronic health record systems, electronic medical record systems, forecasting systems, adaptive learning systems, automated learning engine systems, alerting engine systems, machine learning systems, artificial intelligence systems, neural network systems, research systems, financial systems, data-driven prognostics systems, network systems, computer network systems, communication systems, router systems, server systems, high availability server systems (e.g., Telecom server systems), Web server systems, file server systems, data server systems, disk array systems, powered insertion board systems, cloud-based systems, and the like. In one example, the respiratory health monitoring component 101 can be associated with a Platform-as-a-Service (PaaS) and/or a medical data management system. Moreover, the respiratory health monitoring component 101 can be employed to use hardware and/or software to solve problems that are highly technical in nature (e.g., related to machine learning, related to digital data analysis, related to digital data analytics, etc.), that are not abstract and that cannot be performed as a set of mental acts by a human.

Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In this regard, the respiratory health monitoring component 101 can be and include various computer executable components. In the embodiment shown, these computer executable components include includes a data collection component 102, a tracking component 104, historical multimodal patient data 106, an oxygen support forecasting component 108, a notification component 110 and an oxygen support forecasting model 112. The respiratory health monitoring component 101 can include memory 114 for storing computer executable components and instructions (e.g., the data collection component 102, the tracking component 104, the historical multimodal patient data 106, the oxygen support forecasting component 108, the notification component 110, the oxygen support forecasting model 112, and other components discussed infra). The respiratory health monitoring component 101 can further include a processor 116 to facilitate operation of the instructions stored in the memory. Examples of said and memory 114 and processor 116 as well as other suitable computer or computing-based elements, can be found with reference to FIG. 11, and can be used in connection with implementing one or more of the systems or components shown and described in connection with FIG. 1 or other figures disclosed herein.

The data collection component 102 can collect, extract or otherwise receive multimodal patient data 118 for processing by the respiratory health monitoring component 101. The multimodal patient data 118 can include data associated with one or more patients with a respiratory condition that the respiratory health monitoring component 101 is being used to monitor in association with forecasting their oxygen support needs over their course of care/treatment. For example, the multimodal patient data 118 may include data for all patients currently admitted to a hospital, data for a group of patients with a known or potential respiratory condition currently admitted to the hospital, data for a group of patients associated with a specific inpatient unit (e.g., the ICU), data for a group of patients diagnosed with a specific respiratory condition (e.g., COVID-19), and so on. In this regard, the respiratory health monitoring component 101 can be used to monitor and forecast the oxygen support needs of a plurality of different patients simultaneously. The particular respiratory condition or illness the patients' have or may have (e.g., could be assumed yet not yet diagnosed) can vary.

In various exemplary embodiments, the multimodal patient data 118 can be collected for patients over their course of treatment at an inpatient medical facility. For example, the data collection component 102 can begin collecting multimodal patient data 118 for a patient upon admittance to the inpatient medical facility and end data collection for that patient upon discharge. Additionally, or alternatively, the data collection component 102 can collect multimodal data for patients after discharge, for home-care patients, and patients being treated at various other types so inpatient and out-patient medical care institutions (e.g., clinics, assisted living facilities, surgery centers, etc.).

The multimodal patient data 118 for each patient (or in some implementations one or more) can include a plurality of diverse temporal and static features that may be used as input to the oxygen support forecasting model 112 to generate forecasted oxygen support data 120 for the patient. The temporal features can provide information regarding the patient's physiological state (e.g., vitals and other physiological parameters) and treatment (e.g., oxygen support mechanism used, procedures performed, medications administered and other events) as it changes over the course of care, while the static features can provide relevant information regarding the patient's medical history, physical profile, and demographic profile. As described in greater detail below, the forecasted oxygen support data 120 can include information regarding whether the patient is expected to need an upgrade (or not) or a downgrade (or not) to their current oxygen support mechanism within a defined upcoming timeframe (e.g., the next 30 minutes, the next hour, etc.).

Figure 2:
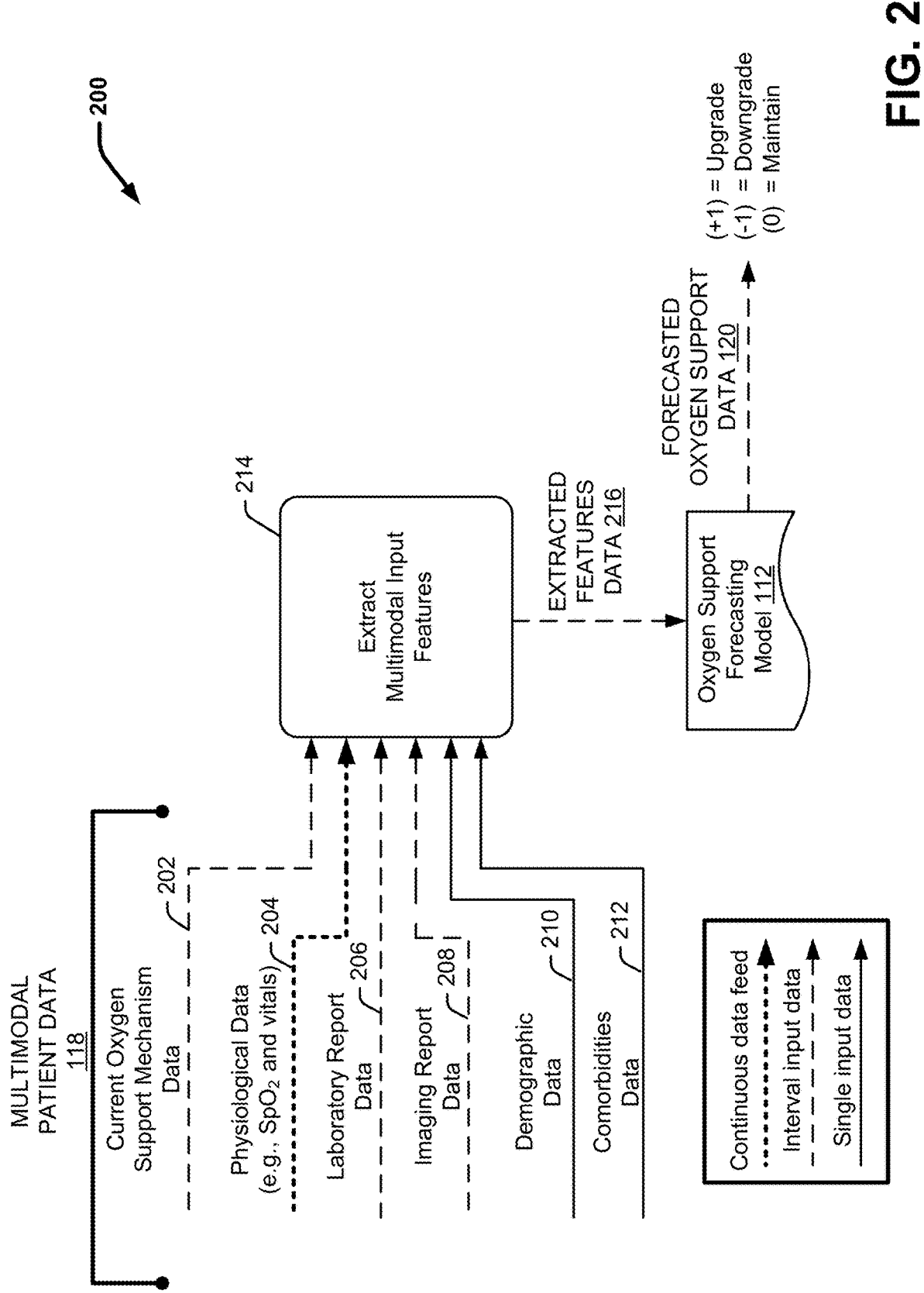
FIG. 2 illustrates a high-level flow diagram of an example process for forecasting patient oxygen support needs in accordance with one or more embodiments described herein.

With reference to FIG. 2, illustrated is a high-level flow diagram of an example process 200 for forecasting patient oxygen support needs in accordance with one or more embodiments described herein. Process 200 is described with reference to a single patient, however it should be appreciated that process 200 can be performed simultaneously and/or in parallel for multiple patients. In accordance with process 200, at 214, multimodal input features may be extracted from multimodal patient data 118 to generate extracted features data 216. The extracted features data 216 is further input to the oxygen support forecasting model 112 to generate the forecasted oxygen support data 120. In this example, the forecasted oxygen support data 120 can include information indicating whether the system recommends the patient should upgrade, downgrade, or maintain their current oxygen support mechanism within an upcoming timeframe.

As illustrated in FIG. 2, the multimodal patient data 118 can include (but is not limited to): current oxygen support mechanism data 202, physiological data 204, laboratory reports data 206, imaging reports data 208, demographic data 210 and comorbidities data 212. This multimodal patient data 118 can be received as either as continuous data feed (indicated by a small, dashed arrow line), interval input data (indicated by the larger dashed arrow line), or single input data (indicated by a solid arrow line).

The current oxygen support mechanism data 202 can provide information regarding the patient's current oxygen support mechanism. This information can vary depending on the types of oxygen support mechanisms used/available at the healthcare facility/environment where the patient is being treated. In many hospital environments, almost every patient admitted to an ED or ICU is placed on some form of oxygen administration. Often the choices are to provide oxygen via a mask, or a more aggressive form of clinical management, such as noninvasive ventilation (NIV) or mechanical ventilation (MV). The first-line therapy for those with respiratory distress and/or hypoxemia is supplemental oxygen, with a goal of improving oxygen to >88-90% and reducing their work of breathing. There are several types of devices used for the disposal for oxygen. Some examples include, but are not limited to: nasal cannula (NC), face mask, venturi mask, high flow nasal cannula (HFNC), and noninvasive ventilation (NIV)/noninvasive positive pressure ventilation (NIPPV).

Historically, oxygen delivery devices have been labeled as either low-flow (LF) or high-flow (HF), based on design application. Low-flow systems often are more comfortable, but the ability to deliver a precise oxygen concentration in various respiratory breathing patterns is limited. High-flow oxygen therapy systems can deliver a high-flow air/oxygen blend through a nasal cannula or tracheal adapter, providing an alternative to other forms of ventilation. By providing flow rates of up to 60 liters per minute (LPM), high molecular humidity, and precise oxygen delivery, HF may reduce the need for noninvasive ventilation and intubation in selected patient populations. Recently, an oxygen delivery device has been developed that can deliver precise oxygen concentrations at various flow rates and provide a level of comfort to the patient. It also can deliver positive end-expiratory pressure (PEEP) that may splint conducting airways or recruit collapsed alveoli. Since it utilizes a molecular humidification system, it can increase humidity delivery and promote mucokinesis, thus helping to prevent mucous plugging.

In various exemplary embodiments, the oxygen support mechanisms are categorized into the following four groups: room air (RA), low flow (LF), high flow (HF) and mechanical ventilation (MV). In accordance with this categorization, RA is considered the least intense option, followed by LF, then HF, and thereafter MV as the highest option. It should be appreciated however that the types of oxygen support mechanisms that may be captured in the current oxygen support mechanism data 202 can include variety of additional an alternative mechanisms and delivery device combinations. In some embodiments, the current oxygen support mechanism data 202 can not only indicate the specific mechanism (e.g., RA, LF, HF or MV), but the specific delivery device used (e.g., make/model), and the flow rate. For example, in some implementations, the current oxygen support mechanism data 202 can identify the oxygen support mechanism used, the delivery device and the current flow rate.

The current oxygen support mechanism data 202 is considered interval input data because this information generally changes only when the mechanism changes, which can vary in frequency depending on the patient's condition. For example, some patient may remain on the same oxygen support mechanism for several hours or days, while others may switch to a different mechanism throughout the hour. In this regard, the current oxygen support mechanism data 202 can be considered temporal and tracked over time, providing a timeline of when a particular mechanism is initiated and ended (e.g., transitioned to a different oxygen support mechanism or otherwise ended). In some implementations in which the flow rate is also tracked, the flow rate can also be tracked as a function of time. For example, the flow rate may vary over time within a same oxygen support mechanism. Thus, in some implementations, an upgrade or downgrade to the current oxygen support mechanism can refer to an increase or decrease in flow rate respectively.

The current oxygen support mechanism data 202 can be received from various sources. In some implementations, this data may be received directly from the oxygen support device/system used by the patient. In other implementations, this data may be received from one or more electronic reporting systems in response to manual entry. Other mechanism for capturing end electronically reporting/providing the current oxygen support mechanism data 202 to the respiratory health monitoring component 101 are also envisioned.

The physiological data 204 can include tracked physiological data regarding the patient's condition/state as it changes over their course of care. One important physiological parameter of particular importance used to monitor and determine patient oxygen support need is their oxygen saturation, which may include their peripheral oxygen saturation ($SpO_2$) level and/or their arterial oxygen saturation level ($SaO_2$). In addition to oxygen saturation, the physiological data 204 can also include tracked patient vitals, including temperature, heart rate (HR), respiratory rate (RR), and blood pressure (BP). The physiological data 204 may also include various other physiological parameters that may change over the course of their care that can be correlated to their oxygen support needs. Some additional physiological parameters can include but are not limited to: partial pressure of oxygen ($PO_2$); partial pressure of carbon dioxide (PCO2); breathing frequency (BF, a number of inspirations per minute, given in breaths per minute); tidal volume (VT, the volume of air exhaled in one expiration or inspiration, given in liters); ventilation (VE, the volume of air inhaled (inhaled minute volume) or exhaled (exhaled minute volume) from a person's lungs, given in liters per minute); vital capacity (VC, the maximum amount of air a person can expel from the lungs after a maximum inspiration, given in liters); oxygen uptake ($VO_2$, volume of oxygen received by an organism per minute, given in ml/min/kg); $VO_2$ max (maximum oxygen uptake); carbon-dioxide production ($VCO_2$, volume of the exhaled $CO_2$ per minute, given in ml/min/kg; respiratory exchange ratio (RER); respiratory quotient (RQ, the ratio of the exhaled $CO_2$ to the inhaled $O_2$); and oxygen pulse ($VO_2$/HR, volume of oxygen transported into the blood circulation during one heart contraction).

The physiological data 204 can be received/collected as a continuous data feed because this information may be captured and monitored continuously or regularly. For example, a patient's $SpO_2$ and vitals can be captured at a relatively high frequency (e.g., every second, every minute, every 10 minutes, every hour, etc.) and reported in real-time. The frequency of capture and reporting of the different physiological parameters can vary. In this regard, the physiological data 204 can be considered temporal and tracked and monitored over the course of the patient's care. The physiological data 204 can be received from various sources. In some implementations, this data may be received directly from medical monitoring devices/system used by the patient. In other implementations, this data may be received from one or more electronic reporting systems in response to manual entry. Other mechanism for capturing end electronically reporting/providing the physiological data 204 to the respiratory health monitoring component 101 are also envisioned.

The laboratory report data 206 can include the results of laboratory tests performed for the patient. In various embodiments, the laboratory tests can include diagnostic testing results that indicate the presence/absence of a particular respiratory disease/condition and/or the severity of disease/condition. For example, as applied to COVID-19 patients, the laboratory reports data 206 can include the results of one or more polymerase chain reaction (PCR) tests used to diagnose presence or absence or the COVID-19 disease and/or the presence/absence of pneumonia and other secondary lung infections related to COVID-19. The laboratory report data 206 can also include various other types of laboratory testing results related to the patient's physiological state. Some other relevant laboratory parameters that may be captured in the laboratory report data 206 can include, but are not limited to: Laboratory Parameters that can be used (but not limited to): partial pressure of oxygen in arterial blood ($PaO_2$), partial pressure of carbon-dioxide in arterial blood ($PaCO_2$), procalcitonin, D-dimer, creatinine, C-reactive protein, white blood cells, lymphocytes, and platelets.

The imaging reports data 208 can similarly include the results of imaging studies performed for the patient. For example, the imaging reports data 208 can include radiologist reports and/or the results of one or more medical image inferencing models in association with automatically evaluating lung images (e.g., XR lung images, CT lung images, and the like). The results can identify or indicate the presence or absence of lung disease, the particular type of lung disease (e.g., COVID-19 pneumonia or regular pneumonia), and/or the stage/severity of the disease.

The laboratory report data 206 and the imaging report data 208 are considered interval input data because this information is generally received one to five times over the course of a patient's care. The frequency with which laboratory results and/or imaging study results are received can vary. In some cases, this information may not be received at all. The laboratory reports and imaging study reports can also include time-stamp information that identifies the time at which the test was performed and/or the time at which the results were received. Thus, the system can track the patient's laboratory and imaging study results as a function of time. The laboratory report data 206 and the imaging report data 208 can be received from various sources. In some implementations, this data may be received directly from the laboratory reporting system and imaging system used to generate and report the data. In other implementations, this data may be received from one or more electronic reporting systems in response to manual entry. Other mechanism for capturing end electronically reporting/providing the laboratory report data 206 and the imaging report data 208 to the respiratory health monitoring component 101 are also envisioned.

The demographic data 210 can include demographic information for the patient, such as but not limited to: age, gender, BMI, height/weight, location (e.g., country/region of residence/origin and/or location where the patient contracted the disease), ethnicity, smoking history, fitness level, exercise routine, mobility level, and the like. The comorbidities data 212 can include information regarding any comorbidities the patient may have. In some embodiments, the comorbidities included in the comorbidities data 212 can be restricted to a predefined set of relevant comorbidities that are tailored to a particular respiratory condition. For instance, some comorbidities that may be relevant to predicting oxygen needs for COVID-19 patients may include, (but are not limited to), cancer, cardiovascular disease, blood disorder, kidney disease, liver disease, metabolic disease, neurodegenerative disease and pregnancy to list a few.

The demographic data 210 and the comorbidities data 212 is considered static as this information does not generally change over the course of the patients care. In various embodiments, this information can be received once and repeatedly utilized at every inference time (e.g., at every application of the oxygen support forecasting model 112. The demographic data 210 and the comorbidities data 212 can be received from various clinical data sources and systems. For example, the demographic data 210 and the comorbidities data 212 may be extracted from one or more EHR systems/databases, electronic medical record (EMR) systems/databases, and the like.

With reference again to FIG. 1 and FIG. 2, as discussed above, the data collection component may regularly and/or continuously receive the current oxygen support mechanism data 202 and the physiological data 204 for a patient from one or more medical monitoring devices/systems associated with the patient. The data collection component may also receive laboratory results data and imaging study report data for the patient from corresponding laboratory reporting and imaging reporting systems when it becomes available (e.g., which may be once or multiple times over the course of the patient's care). The tracking component 104 can further track this temporal patient data as it received over time as historical multimodal patient data 106. The data collection component 102 can also receive relevant information regarding the patient's demographic profile (e.g., age, weight, body mass index (BMI), ethnicity, location, smoking history, etc.), comorbidities, medical history, and other static data inputs, from one or more electronic health record (EHR) systems (or the like) at any point prior to application of the model (e.g., upon admission and/or in association with initiating monitoring of the patient's respiratory condition). The tracking component 104 can also store the demographic data 210 and comorbidities data 212 received for a patient in the historical multimodal patient data 106 with their other tracked temporal data. In this regard, the historical multimodal patient data 106 can include multimodal patient data for a plurality of different respiratory illness patients that reflects the various static and temporal parameters discussed above.

The oxygen support forecasting component 108 can further apply the oxygen support forecasting model 112 to the received/tracked multimodal patient data at one or more points throughout their course of care to forecast their upcoming oxygen support needs. For example, in some embodiments, the oxygen support forecasting component 108 can be configured to apply the oxygen support forecasting model 112 to the current set of tracked multimodal patient data for a patient according to a defined schedule, such as once every 30 minutes, once every hour, etc., to forecast whether they should upgrade, downgrade or maintain their current oxygen support mechanism in the next 30 minutes, the next hour, and so on. In other embodiments, the oxygen support forecasting component 108 can be configured to apply the oxygen support forecasting model 112 based on reception of new multimodal data reflecting a new event or a change in the previously tracked patient data. For example, the new event may include a change in the patient's tracked vitals, newly received laboratory results, newly received imaging study results, and so on. In some embodiments, the oxygen support forecasting component 108 can be configured to apply all the tracked temporal patient data received up to the time of model application (e.g., their tracked oxygen support mechanism data, their tracked physiological data, etc.) as input to the forecasting model in addition to the static inputs. Additionally, or alternatively, the oxygen support forecasting component 108 can restrict the temporal input parameters to those received/tracked for within a predefined time window prior to the current point in time at which the model is applied (e.g., the past six hours or another restricted time window). For example, in some implementation in which the forecasting component 108 is configured to apply the model every hour to forecast their oxygen support needs for the next hour, the forecasting component may use only use the temporal data received in the last six hours prior to model application, thus limiting the number of model inputs.

As noted above, the oxygen support forecasting model 112 may include a previously trained machine learning model that has been adapted to process a predefined set of input parameters that are or may be included in the multimodal patient data. In some embodiments, the oxygen support forecasting component 108 can perform a feature extraction process to identify and extract these input parameters (and their values) from the multimodal patient data 118 prior to model input, as exemplified in FIG. 2. In other embodiments, the feature extraction process can be built into the oxygen support forecasting model 112.

The type of machine learning model or models employed for the oxygen support forecasting model 112 can vary. In some embodiments, the oxygen support forecasting model 112 can be or include a linear regressor model, a multilayer perception (MLP) model, a regularizing gradient boosting model, or a combination thereof. Other suitable types of machine learning models can include but are not limited to deep learning models, neural network models, deep neural network models (DNNs), convolutional neural network models (CNNs), generative adversarial neural network models (GANs), transformers, long short-term memory models (LSTMs), classification models, clustering models, decision tree models, and the like. In some embodiments, the oxygen support forecasting model 112 can be tailored to a specific patient group, respiratory disease/condition and/or disease stage. Techniques for training and developing the oxygen support forecasting model 112 are discussed in greater detail infra with reference to FIG. 5.

As discussed above, in some embodiments, the output of the oxygen support forecasting model (e.g., the forecasted oxygen support data 120) can include information that indicates whether the patient should maintain, upgrade, or downgrade their current oxygen support mechanism within a defined upcoming time-fame. With these embodiments, the particular change to the current oxygen support mechanism employed by the patient may be predefined based on a predefined (e.g., according to defined rules regarding the appropriate upgrade or downgrade give the patient's current oxygen support mechanism. For example, assume the only oxygen support mechanisms available include RA, LF, HF and MV and the protocol defines the hierarchy of these mechanism as RA<LF<HF<MV. According to this hierarchy, if the patient is currently receiving RA and the model outputs an upgrade forecast, then a clinician reviewing the recommendation to upgrade will know the next step up for the patient will be LF. Additionally, or alternatively, the oxygen support forecasting component 108 can include information in the forecasted oxygen support data 120 that identifies the appropriate upgrade or downgrade based on the patient's current oxygen support mechanism and the predefined protocols.

It should be appreciated that example oxygen support hierarchy/protocol described above is merely exemplary and that the level of granularity and sophistication of the oxygen support mechanism changes and options available can vary. For example, in some embodiments, a recommendation to upgrade or downgrade may be tied to a change in oxygen device type, oxygen device make/model and/or flow rate (e.g., as defined according to a predefined upgrade/downgrade protocol). Thus, in some embodiments, the forecasted oxygen support data 120 can provide information indicating the recommendation type (e.g., upgrade, downgrade, or maintain), and the specific change that should be made give the patient's current oxygen support mechanism a determined (by the oxygen support forecasting component 108 based on a predefined upgrade/downgrade protocol. The specific change may include a change between RA, LF, HF and MV, a change in device type, a change in device make/model, and/or a change in a current flow rate. In some implementations in which the change involves a change in flow rate, the forecasted oxygen support data 120 can also identify the recommended new flow rate. Still in other embodiments, the respiratory health monitoring component 101 may be configured to automatically interface with the oxygen support device and control/adjust the flow rate (e.g., without manual intervention) at the forecasted time of need based on the model output.

In some embodiments, the oxygen support forecasting model 112 can also be adapted to generate output forecasts for different future points in time. For example, the model can forecast the patient's oxygen support needs in 10 minutes from the current point in time, followed by 30 minutes from the current point in time, followed by 60 minutes from the current point in time, and so on. In some implementations of these embodiments, different oxygen support forecasting models can be tailed to different future points in time and the oxygen support forecasting component 108 can apply each of the different models to generate the different forecasts. The oxygen support forecasting model 112 (or models) may also be adapted to generate a confidence metric that reflects the model's degree of confidence in the output prediction make. For example, the confidence metric can reflect a binary scale (e.g., either high confidence or low confidence), a sliding scale (e.g., from a scale of 1 to 10 with 1 being lowest confidence and 10 being the highest confidence), or another suitable confidence scale. The confidence measure can also be included with forecast output (e.g., model output=upgrade, confidence level=high). In some embodiments, the respiratory health monitoring component 101 may be configured to perform one or more automated actions based on the confidence output. For example, the respiratory health monitoring component 101 may be configured to automatically change the flow rate of an oxygen support device (e.g., either increasing for an upgrade forecast or decreasing for a downgrade forecast as defined according to the predefined upgrade/downgrade protocol) only if the model confidence is above a defined threshold.

The oxygen support need forecasts generated by the model can be used to facilitate clinical decisions by individuals caring for the patients and optimize allocation of available oxygen support resources. In some embodiments, the forecasted oxygen support data 120 can be presented to one or more clinicians in real-time via one or more display devices accessible to the clinicians. Additionally, or alternatively, the notification component 110 can be configured to notify the clinicians (or another suitable entity) regarding the output forecasts generated by the model. For example, the notification component 110 can be configured to generate and send electronic notifications to one or more devices accessible to the clinicians in response to generation of a new output forecast for a patient. In other embodiments, the notification component 110 can be configured to notify clinicians regarding an output forecast based on the output forecast indicating a change is recommended to the current oxygen support mechanism employed by the patient (e.g., either an upgrade or downgrade). For example, the notification component 110 may be configured to provide urgent notifications to clinicians in response to a recommendation to upgrade (or downgrade), while merely tracking output forecasts that indicate the current oxygen support mechanism should be maintained. Notifications generated by the notification component 110 are represented in FIG. 1 as notification data 122. In this regard, the notification component 110 can provide for automatically notifying clinicians in real-time when a patient is expected to need a change to their current oxygen support mechanism before the need materializes, thereby minimizing potential clinical complications that may result from failure to perform the appropriate change or failure to perform the appropriate change in a timely manner.

The notification data 122 can include one or more different notifications that are uniquely configured, displayed and/or generated. In an embodiment, the notification component 110 can provide the notification data 122 to a display device such as, for example, a mobile device, a mobile application for a mobile device, a wall display, a monitor and/or another type of display device. In certain embodiments, the notification data 122 can alter a graphical element and/or a graphical indicator for a user interface. For example, the notification data 122 (e.g., the one or more alerts) can alter a color of a graphical element associated with a user interface. In certain embodiments, the notification component 110 can generate the user interface, for display on the display device, that outputs the notification data 122 and/or the patient census data in a human interpretable format. In certain embodiments, the notification component 110 can display real time data in a user-friendly format.

As described herein, a real-time computer system can be defined a computer system that performs its functions and responds to external, asynchronous events within a defined, predictable (or deterministic) amount of time. A real-time computer system such as system 100 typically controls a process (e.g., monitoring and forecasting patient oxygen support needs and providing notifications before the need materializes) by recognizing and responding to discrete events within predictable time intervals, and by processing and storing large amounts of data acquired from the controlled system (e.g., the multimodal patient flow data 118). Response time and data throughput requirements can depend on the specific real-time application, data acquisition and critical nature of the type of decision support provided. In the regard, the term "real-time" as used herein with reference to processing and generating information by the forecasting component 101 refers to performance of these actions within a defined or predictable amount of time (e.g., a few seconds, less than 10 seconds, less than a minute, etc.) between reception of new multimodal patient data 118 by the forecasting component 101. Likewise, the term real-time as used with reference to reception of the patient flow data 118 refers to reception of the patient flow data 118 by the forecasting component 101 from the one or more healthcare systems/sources within a defined or predictable amount of time (e.g., a few seconds, less than 10 seconds, less than a minute, etc.) after the corresponding information is generated by and/or received by the one or more healthcare systems/sources.

In this regard, the forecasting component 101 can regularly and/or continuously receive the various types of multimodal patient data 118 discussed above from a variety of data systems/sources of the medical facility in real-time. For example, the forecasting component 101 can multimodal patient data 118 from one or more from case status tracking systems, patient location tracking systems/devices, patient vital signs monitoring systems, medical monitoring devices associated with the patients, and the like. In some implementations, these tracking and/or monitoring systems/devices can include systems/devices configured to receive and report user input in real-time explicitly identifying and/or indicating such status information (e.g., regarding the patient's active case status, location, workflow event progress, staff involved, etc.). These tracking and/or monitoring systems/devices can also include intelligent systems/devices configured to determine and report various real-time status information without or with minimal manual input based on analysis of sensor/device captured data signals. For example, these tracking and/or monitoring systems/devices can also include systems/devices configured determine information regarding what's currently happening to the patient (e.g., workflow events), where the patient is currently located, who is currently treating/attending to the patient, and the like based on analysis of a variety of captured data, including but not limited to: image data (e.g., using object recognition and/or other image pattern recognition technologies), audio data (e.g., using speech to text and natural language processing NPL), motion sensor data (e.g., using motion pattern recognition technology), radio frequency (RF) data, temperature sensor data, light sensor data, infrared (IR) senor data, biometric sensor data, and the like.

In an aspect, the patient flow data 118 can be generated by one or more devices and/or one or more equipment located within the set of medical inpatient units. For example, the patient data can be generated by one or more medical devices, one or more medical equipment, one or more sensors, one or more mobile devices, one or more computers, one or more tablet computers, and/or one or more other devices. In certain embodiments, the patient data can be generated by one or more surgical instruments such as, but not limited to, one or more anesthetic machines, one or more post anesthetic care machines, surgical tracking software, and/or another type of surgical instrument. Furthermore, the one or more devices and/or one or more equipment located within the set of medical inpatient units can be one or more network-connected devices and/or one or more network-connected equipment. In another aspect, the patient data can be obtained from one or more medical logs. For example, the patient data can be obtained from one or more electronic medical records.

While FIG. 1 depicts separate components in the forecasting component 101, it is to be appreciated that two or more components may be implemented in a common component. Further, it can be appreciated that the design of system 100 and/or the forecasting component 101 can include other component selections, component placements, etc., to facilitate census forecasting for one or more medical inpatient units.

Figure 3:
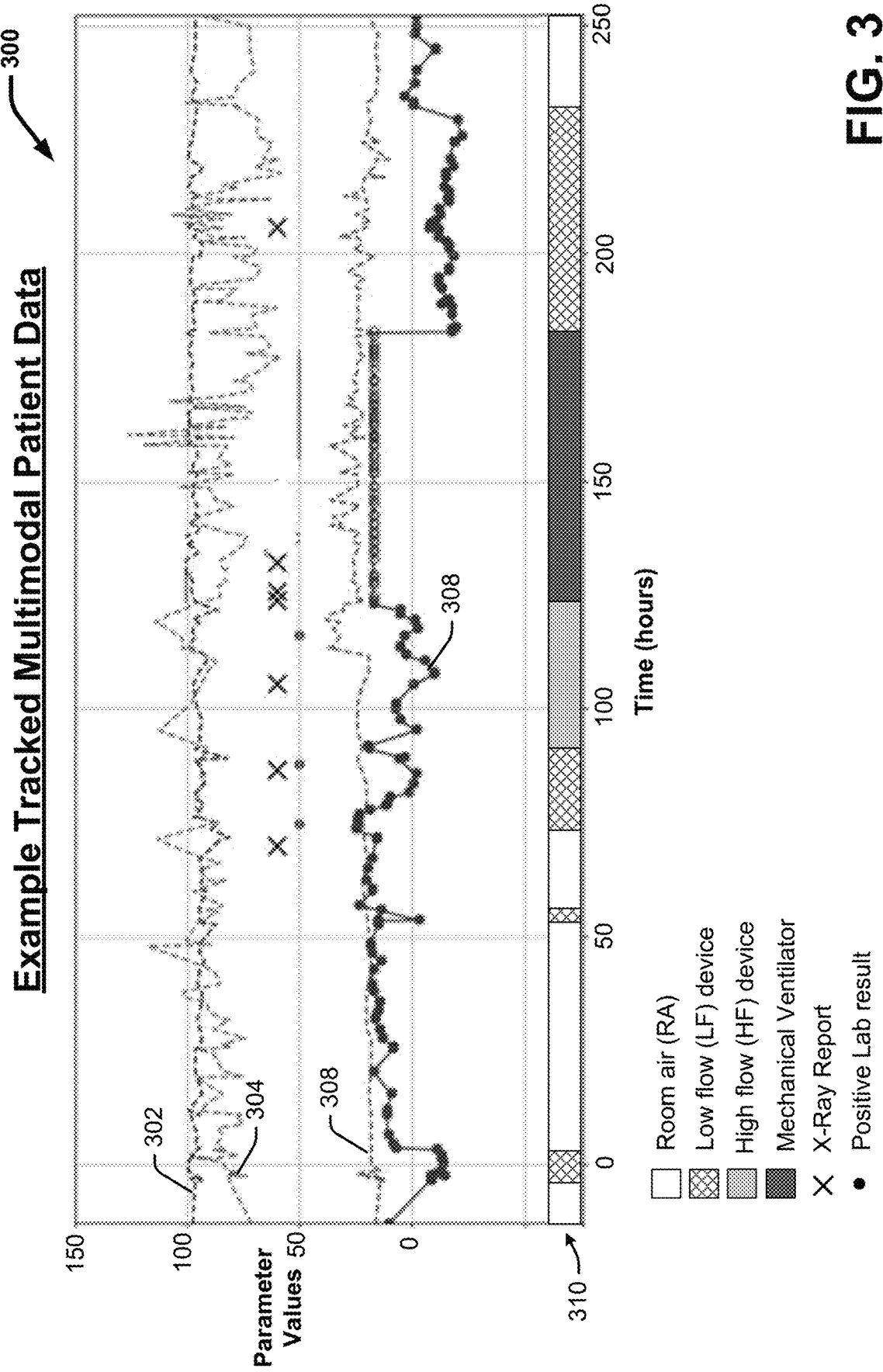
FIG. 3 presents a chart depicting example tracked multimodal patient data in accordance with one or more embodiments described herein.

FIG. 3 presents a chart 300 depicting example tracked multimodal patient data in accordance with one or more embodiments described herein. Chart 300 plots several example temporal parameters related to a respiratory patient's condition and treatment as a function of time over a course of their treatment. In this example, the temporal parameters were captured in association with monitoring and treating the patient in the ICU. The horizontal (x-axis) tracks time in hours and the vertical axis (y-axis) corresponds to the tracked parameter values generally. Hour zero in this example corresponds to the time at which the patient was admitted to the ICU. The y-axis parameter values in this example are represented with general numerical values from −50 to 150. These numbers can correspond to different metrics for different parameters and are merely arbitrary placeholder values in this example.

Bar 310 along the lower portion of the x-axis plots the patient's oxygen support mechanism as it changes over time. In this example, the time at zero hours (i.e. t=0) corresponds to the time of admission of the patient to the ICU. The different oxygen support mechanisms here include RA (no support), LF, HF, and MV. As illustrated in chart 300, when the patient was admitted to the ICU, the patient was stepped up from RA to LF. The patient switched between RA and LF up to around hour 100 at which time the patient was stepped up to HF. From about hours 125 to 175 the patient was placed on MV. Around hour 175 the patient was stepped down to LF and then further stepped down to RA around hour 230.

As indicated in the legend, the X symbol represents reception of a radiology report results and the dot symbol (●) represents reception of a lab results for a tested disease/condition, which in this case were the results of a COVID-19 RT-PCR tests. Line 302 plots the patients $SpO_2$, line 304 plots the patient's heart rate, line 306 plots the patient's respiratory rate, and line 308 plots the patients $PO_2$. It should be appreciated that these parameters are merely exemplary and not intended to be exhaustive of all the temporal parameters that may be tracked and used as input to the oxygen support forecasting model 112.

Chart 300 visually captures how changes in different physiological parameters over time influence decisions to increase and decrease the patient's oxygen support mechanism between RA, LF, HF and MV. As discussed in greater detail infra with reference to FIG. 5, the oxygen support forecasting model 112 employs one or more machine learning techniques to learn the relationships between these different temporal features/feature values and how they influence when the patient will need to step up, step down, and maintain different levels of oxygen support.

Figure 4:
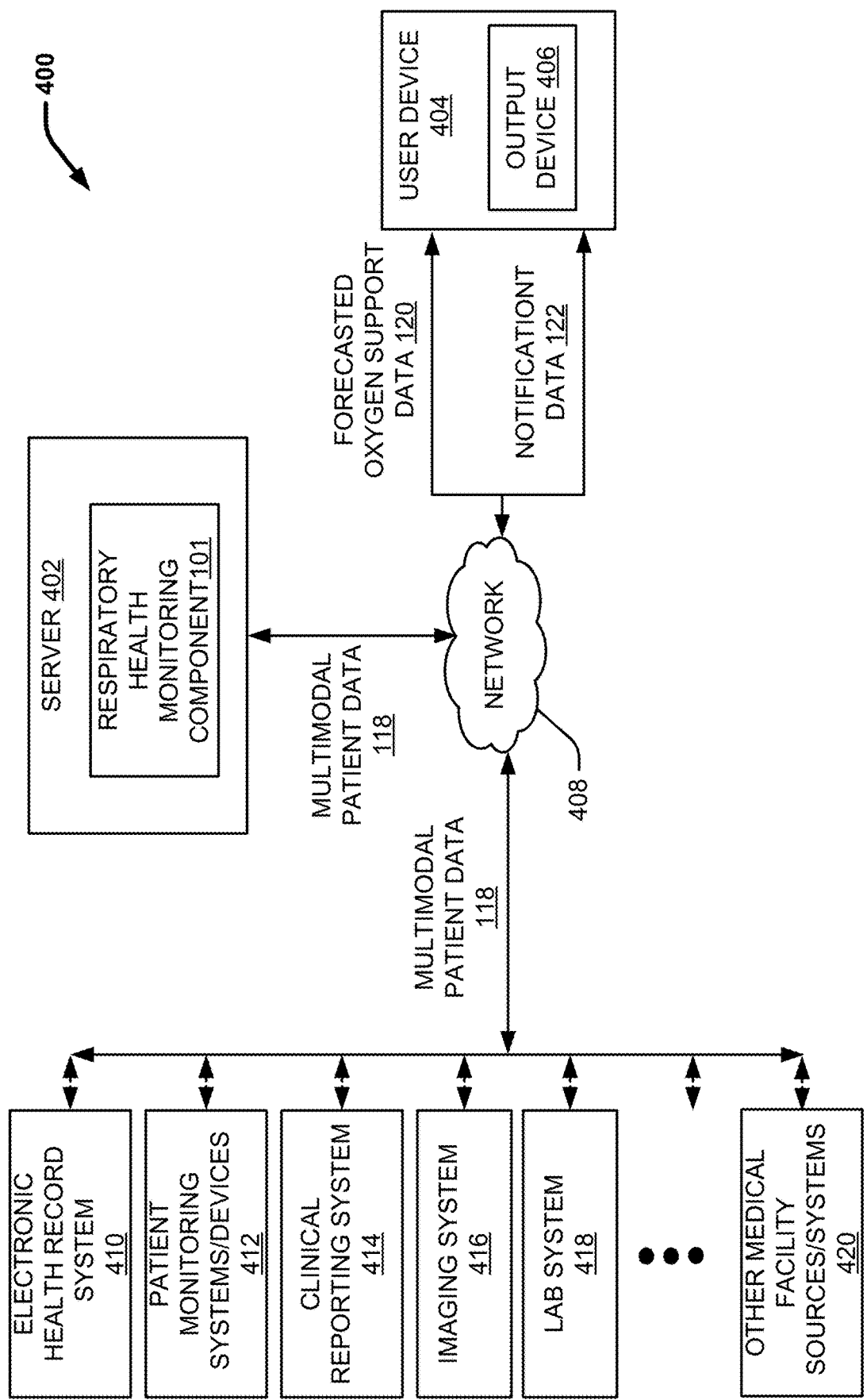
FIG. 4 illustrates an example system for monitoring, predicting and/or alerting for respiratory illness patient short-term oxygen support needs in accordance with one or more embodiments described herein.

FIG. 4 illustrates an example system 400 for monitoring, predicting and/or alerting for respiratory illness patient short-term oxygen support needs in accordance with one or more embodiments described herein. Repetitive description of like elements employed in other embodiments described herein is omitted for sake of brevity.

System 400 includes a server 402 that includes the respiratory health monitoring component 101, a user device 404, a network 408, and a plurality of different data sources and systems from which the respiratory health monitoring component 101 may collect/receive/extract the patient multimodal patient data 118 (e.g., using the data collection component 102). These data source/systems may include for example, a patient electronic health record (EHR) system 410, one or more patient monitoring systems/devices 412, a clinical reporting system 414, an imaging system 416, a laboratory system 418, and other medical facility sources/systems 420. The network 408 can include wired and/or wireless communication networks that can operatively and communicatively coupled these various data sources/systems, the server 402 and/or the user device 404 to one another. The network 408 can be a communication network, a wireless network, an internet protocol (IP) network, a voice over IP network, an internet telephony network, a mobile telecommunications network and/or another type of network.

The EHR system 410 can provide a variety of patient information regarding their demographic profile, comorbidities, medical history, the current reported diagnosis/condition. The patient monitoring systems/devices 410 may include various devices and/or systems that track and provide real-time information regarding the patient's physiological condition/state and oxygen support mechanism. For example, the patient monitoring systems/devices 412 can include actual medical devices/systems that are used by the patient to monitor and report vitals and other physiological parameters. The patient monitoring systems/devices 412 can also correspond to oxygen support devices/system being used by patients. In some implementations, these oxygen support devices can be adapted to provide tracked information regarding operating parameters of the devices (e.g., flow rate information, oxygen supply/reserve information, power level information, usage status information, location information regarding where they are located throughout the medical facility, etc.). Further, in some implementation, the respiratory health monitoring component 101 can be adapted to remotely control one or more operating parameters of the oxygen support device. For example, the respiratory health monitoring component 101 can be adapted to automatically adjust flow rates of the oxygen support devices as needed based on the forecasted oxygen support data by issuing corresponding flow rate control/adjustment signals to the respective devices. The patient monitoring systems/device 412 can also include various other systems/devices that can provide information regarding the current location of the patients, the events and conditions that occur throughout the patient's journey, the clinical status of the patient's, the physiological status of the patients (e.g., vitals) and so on.

The clinical reporting system 414 can correspond to one or more systems that clinicians can interface with to report information regarding their clinical evaluation of a patient. For example, the clinical reporting system 414 can correspond to a system that receives clinical notes, dictations, orders, evaluation data and the like regarding their observation/evaluation of patients. The clinical reporting systems 414 can thus provide information regarding the patient's pathology, diagnosis, observed behavior, observed condition, pain level, fatigue level, mood, and so on.

The imaging system 416 can provide medical image data and/or associated reports generated for the respective patients being monitored by the system 400. For example, the multimodal patient data 118 can include information reported by the imaging system 416 identifying timing of a medical image study, the actual image data, and/or the results of an evaluation of the image data. In some embodiments, the imaging system 416 can employ one or more image processing models that process the image data and automatically generate (e.g., via principles of artificial intelligence and machine learning) report data regarding an evaluation of the image data. For example, the image processing models can be adapted to diagnose presence or absence of a disease, quantify the disease, perform a lung segmentation, and so on. Additionally, or alternatively, these image processing models may be accessed and executed by the respiratory health monitoring component 101 to generate the imaging report data prior to input to the model. With these embodiments, the multimodal patient data 118 can include the actual medical images. Still in other embodiments, the report data provided by the imaging system can be generated by a radiologist (or another suitable manual reviewing entity) and included in the multimodal patient data 118 as a radiologist report.

The laboratory system 418 can provide medical laboratory data and associated reports generated for the respective patients being monitored by the system 400. For example, laboratory system 418 can provide information identifying lab orders, lab results and so one, reported in real-time. It should be appreciated that these multimodal patient data 118 sources/systems are merely exemplary and other or alternative types of healthcare data sources/system are envisioned that may provide the multimodal patient data 118. These other systems are represented in system 400 as other medical facility sources/systems 420. In some embodiments, the other medical facility sources/systems 420 can include a resources tracking system that provides information regarding usage, status, availability, and location of oxygen support resources associated with the medical facility where the patients are being monitored. As discussed in greater detail with reference to FIG. 5, this oxygen resources information may be used to optimize allocation of oxygen support resources to patients in real-time based on their forecasted oxygen support needs.

In accordance with system 400 the server 402 receives multimodal patient data 118 from the various data sources/system in real-time over the course of a patient's care for processing by the respiratory health monitoring component 101. The server 402 further provides forecasted oxygen support data 120 and notification data 122 generated by the respiratory health monitoring component 101 to the user device 404. The user device 404 can include any device with at least an output device 406 via which the forecasted oxygen support data 120 and the notification data 122 can be provided to a user of the device. For example, the output device 406 may include a display, a speaker, or another suitable output device. In this regard, the oxygen support data 120 and/or the notification data 122 can be provided to a user in a visual format, an audible format and/or another suitable output format. Some suitable example output devices are described with reference to FIG. 11 and output device 1140. The type of the user device can also vary. For example, the user device 404 can include a display monitor, a wall display, a personal computing device, a mobile device, a smartphone, a laptop computer, a desktop computer, a tablet, a wearable computing device, a heads-up display device, and the like.

Figure 5:
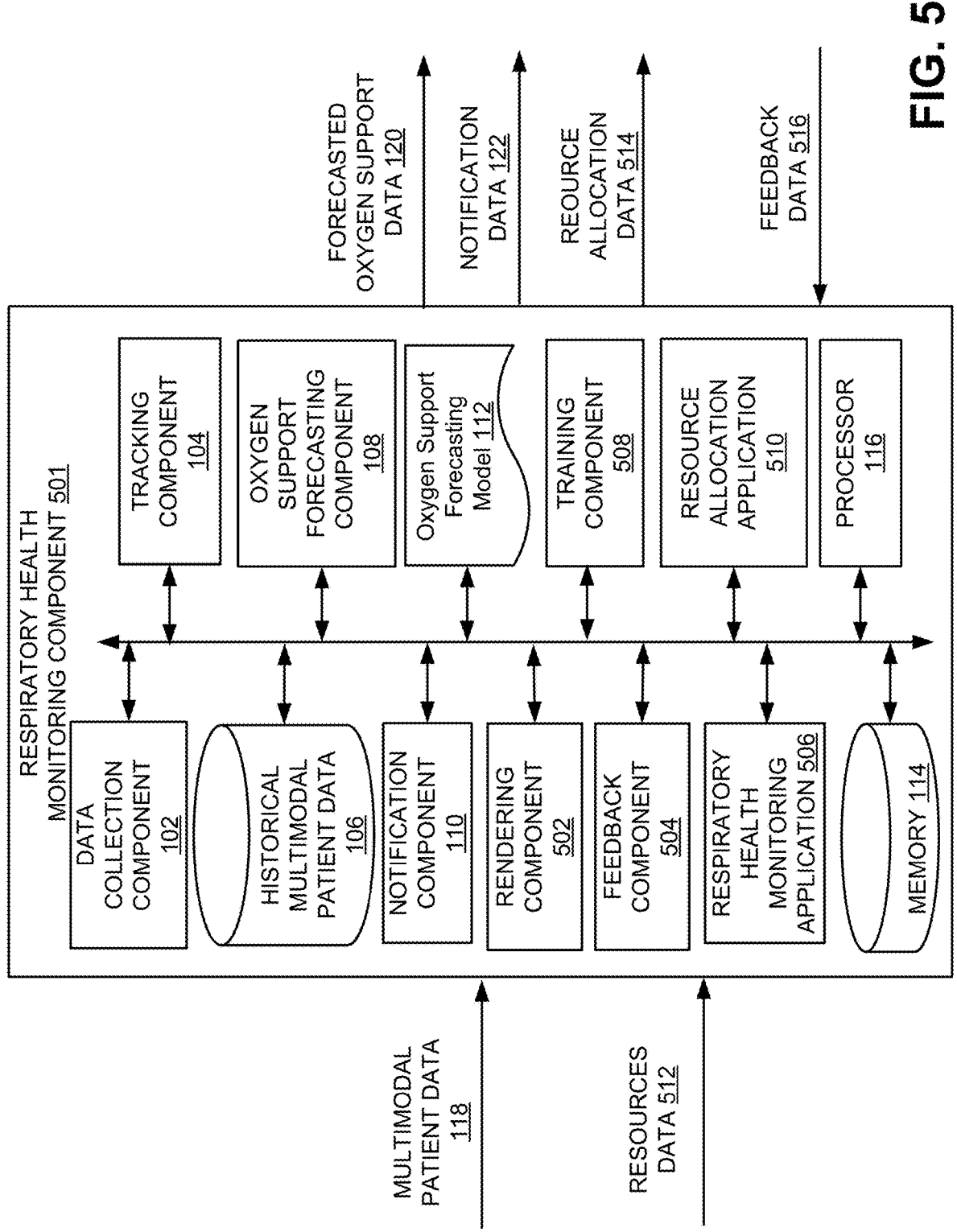
FIG. 5 illustrates a high-level block diagram of another example respiratory health monitoring component, in accordance with one or more embodiments described herein.

FIG. 5 illustrates a high-level block diagram of another example respiratory health monitoring component 501, in accordance with one or more embodiments described herein. The respiratory health monitoring component 501 can include same or similar components as respiratory health monitoring component 101 with the addition of rendering component 502, feedback component 504, respiratory health monitoring application 506, training component 508 and resource allocation component 510. Repetitive description of like elements employed in other embodiments described herein is omitted for sake of brevity.

The rendering component 502 can render or facilitate rendering the forecasted oxygen support data 120 and/or the notification data 122 to a user via a graphical user interface (GUI) displayed at a display device accessible to the user (e.g., user device 404). In some embodiments, the rendering component 502 can also include tracked multimodal patient data 118 received for a patient in the GUI. For example, in some embodiments, the respiratory health monitoring component 501 can include or otherwise provide a respiratory health monitoring application 506 that provides various features related to monitoring respiratory illness patients via an interactive application. For instance, the application can include a web-application, a mobile application, a hybrid application, a thin-client application, a thick-client application, and the like. The application architecture can vary. In some embodiments, the respiratory health monitoring application 506 can provide a GUI that includes one or more dashboard views presenting tracked patient multimodal data that is updated in real-time. The forecasted oxygen support data 120 and/or the notification data 122 can also be provided by the respiratory health monitoring application 506 and displayed via the GUI.

In some embodiments, the respiratory health monitoring application 506 can include an interactive feedback functionality (provided by the feedback component 504) that facilitates receiving user feedback (e.g., feedback data 516) regarding the accuracy of the forecasted oxygen support data 120 via the GUI. Additionally, or alternatively, the feedback functionality can facilitate generating training data that may be used to train and develop the oxygen forecasting model 112 and/or evaluate the performance of the oxygen support forecasting model 112.

Figure 6:
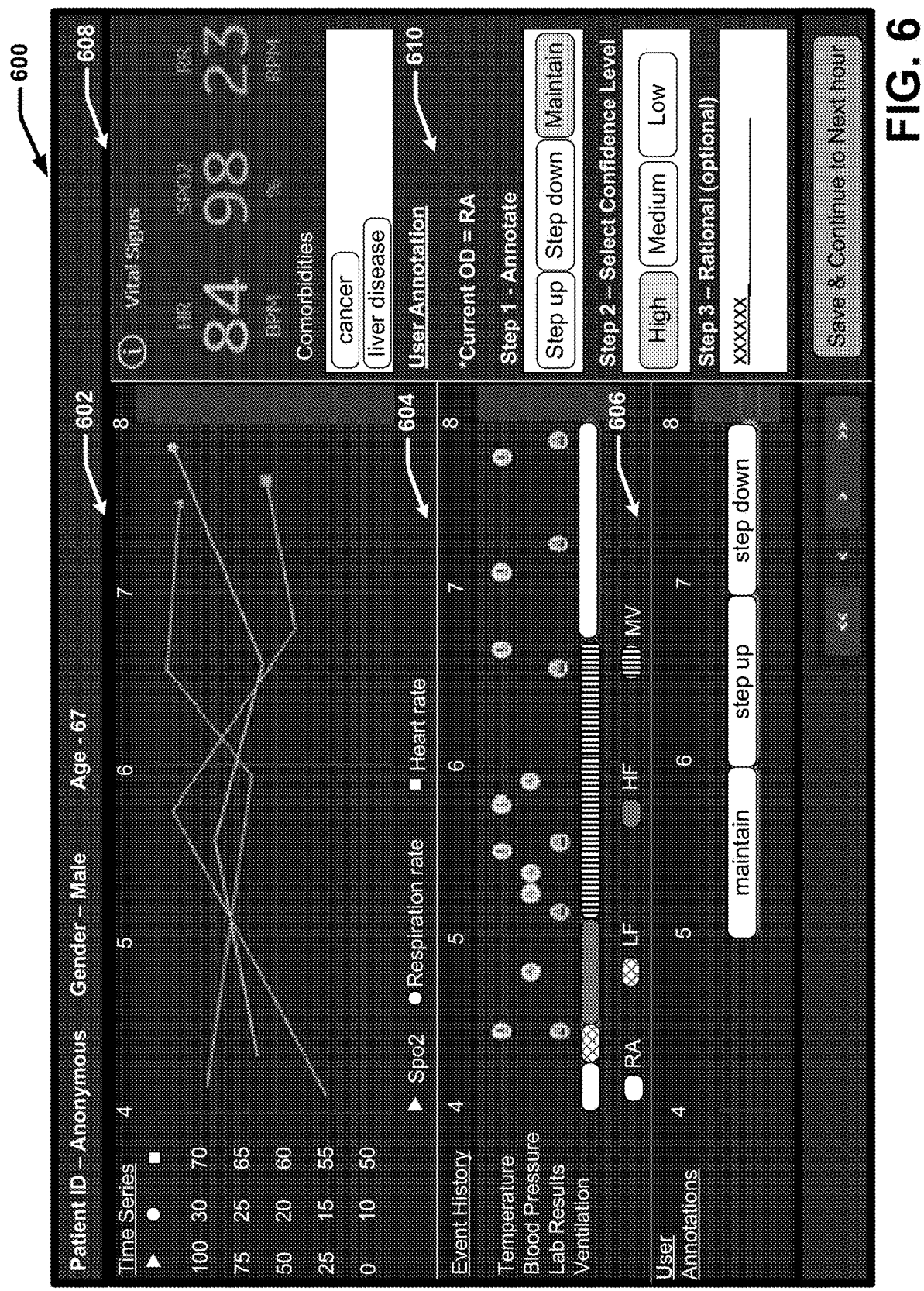
FIG. 6 presents an example graphical user interface (GUI) that facilitates monitoring, predicting and/or alerting for short-term oxygen support needs of patients in accordance with one or more embodiments described herein.

For example, FIG. 6 presents an example GUI 600 that facilitates monitoring, predicting and/or alerting for short-term oxygen support of patients in accordance with one or more embodiments described herein. GUI presents an example GUI that can be generated and/or provided by the respiratory health monitoring application 506 and rendered at a user device via the rendering component 502. The GUI 600 includes time series data 602 that tracks various monitored physiological parameters for a patient in real-time. In this example, the time window displayed includes hours 4 through 8. The GUI further includes event history data 604 and user annotation data 606 tracked according to the same time window as the time series data 602. The event history data 604 tracks temperature checks, blood pressure checks, lab result reception events and the ventilation support mechanism used by the patient. The upper right corner 608 of GUI 600 further provides real-time vital signs data and lists the patient's comorbidities.

The user annotations data 606 includes manually applied annotations regarding manual decisions to either maintain, step up or step down the patient's current oxygen support mechanism. In this regard, GUI 600 provides a manual annotation tool 610 that can be used by reviewers to provide feedback regarding whether they think the patient's oxygen support mechanism should be stepped up, stepped down, or maintained based on the tracked patient data up to the current point in time. In this example, manual annotations have been applied for hours 5, 6 and 7 and the manual annotation tool is being used to generate a manual annotation for the upcoming hour, hour 8. The manual annotation tool 610 indicates the patient's current oxygen device (OD) which in this case is currently RA. The manual annotation tool 610 further provides for receiving user feedback selecting whether they recommend stepping up, stepping down, or maintaining the current OD. The manual annotation tool 610 also provides for receiving their confidence level in their recommendation, and optionally to provide a rational for their recommendation. In this example, the user has provided a recommendation to maintain the current OD with a high confidence level. Once completed, the user may save and continue to the next hour.

The information collected via the manual annotation tool 610 provides feedback that tracks user provided recommendations regarding when they deem it appropriate to step up, step down, or maintain the patients current OD based on the tracked multimodal data for the patient. This information may be aggregated for multiple different patients and reviewers over time and used as training data for training the oxygen support forecasting model 112 and/or for evaluating the performance of the oxygen support forecasting model 112.

In this regard, with reference again to FIG. 5, the respiratory health monitoring component 501 can include training component 508 to provide for training and developing the oxygen support forecasting model 112. As noted above, the oxygen support forecasting model 112 can be or include one more machine learning models, and the training component 508 can employ one or more machine learning techniques to train and develop the oxygen support forecasting model 112 based at least in part on historical multimodal patient data 106. The machine learning techniques can include supervised, unsupervised and/or semi-supervised machine learning techniques. In this regard, the historical multimodal patient data 106 can include tracked multimodal patient data for a plurality of different patients with same or similar respiratory conditions.

As exemplified with reference to FIG. 3 and chart 300, the tracked multimodal patient data for each (or in some implementations one or more) can include a variety of different static and temporal parameters tracked for the patient as well as oxygen support mechanism data that tracks their oxygen support mechanisms, duration of maintaining the oxygen support mechanism, and transitions relative to the temporal parameters. In some embodiments, the historical multimodal patient data 106 can also be associated with annotation data that indicates whether the oxygen support mechanism data for the patient was correct or incorrect. Additionally, or alternatively, the training component 508 can extract or otherwise receive only a subset of the historical multimodal patient data 106 that reflects only accurate/correct clinical decisions regarding the oxygen support mechanism(s) used and the timing of the usage of the oxygen support mechanism. In this regard, the training component 508 can employ only ground truth data to learn patterns in the training data that reflect only correct clinical decisions regarding when to step up, step down, or maintain a particular oxygen support mechanism based on the totality of the tracked patient data (e.g., learning from only correct decisions as opposed to both correct and incorrect decisions). In some embodiments, this training data can be generated using the annotation tool described with reference to FIG. 6.

In one or more embodiments, to train the oxygen support forecasting model, the training component 508 can identify time stretches in the tracked patient training data that indicate transitions (e.g., step ups and step downs) and no transitions in the oxygen support mechanism used for a patient. The training component 508 can further generate training data sets that respectively encompass a set of temporal patient data for a defined time frame preceding the transitions and the maintenance durations (e.g., the past 6 hours leading up to the transition) using non-uniform sampling. In this regard, each training data set can include temporal patient data that reflects various patient parameters tracked for a defined time frame leading up to a transition or a maintenance period. Each training data set can also include the associated static patient features (e.g., demographics and comorbidities). The training component 508 can further extract relevant multimodal features from each training dataset and train the model based on learned correlations between the features that influence when the transition or a maintenance is appropriate. In particular, the training component 508 can train the model to predict when a particular transition will be needed for a patient at some point in time (e.g., one hour before) prior to the need materializing based on the snapshot of temporal data (and static patient data) leading up to the transition.

The performance accuracy of the disclosed forecasting model was tested relative to that of manually predicted patient oxygen needs. In particular, a comparative study was performed using a trained version of the oxygen forecasting model 112 and a set of manual reviewers. Each of the reviewers provided their feedback regarding whether they recommended upgrading, downgrading, or maintaining a patient's current oxygen support mechanism within the next hour based on the patient's static data (e.g., demographics and comorbidities), the patient's current physiological parameters, and the patients tracked multimodal parameters up to the current point in time (e.g., using the manual annotation tool described with reference to FIG. 6). This was repeated for several different patients with different profiles, comorbidities and tracked multimodal feature distributions. The oxygen forecasting model 112 was further applied to the same input data evaluated by the reviews to generate the model recommended oxygen support action or inaction (e.g., step up, step down or maintain). This comparative study found that the oxygen support forecasting model 112 outperformed the readers' individual and collective decisions, thus demonstrating the effectiveness of the disclosed techniques in a clinical setting.

Figure 7:
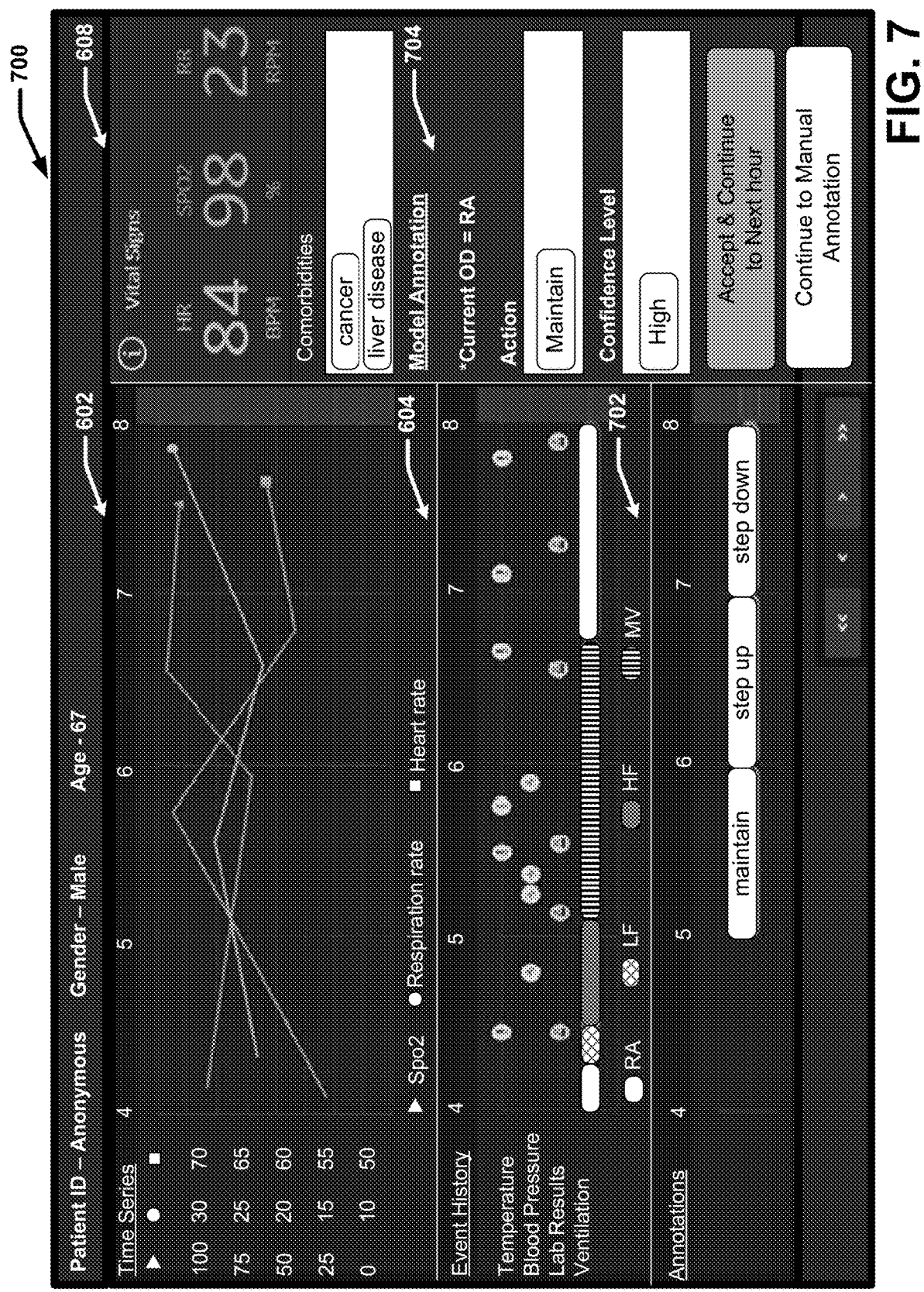
FIG. 7 presents another example GUI that facilitates monitoring, predicting and/or alerting for short-term oxygen support needs of patients in accordance with one or more embodiments described herein.

FIG. 7 presents another example GUI 700 that facilitates monitoring, predicting and/or alerting for short-term oxygen support needs of patients in accordance with one or more embodiments described herein. GUI 700 presents another example GUI that can be generated and provided by the respiratory health monitoring application 506. Repetitive description of like elements employed in respective embodiments is omitted for sake of brevity.

GUI 700 is similar to GUI 600 with the modification of the annotations section and the manual annotation tool. In this embodiment, the annotation section 702 can include manually applied annotations and/or model generated annotations (e.g., generated by the oxygen support forecasting model 112). For example, GUI 700 replaces the manual annotation tool 610 with a model annotation tool 704. The model annotation tool 704 presents the forecast results of the oxygen support forecasting model 112 for the upcoming hour. The model annotation tool 704 further provides for receiving manual feedback either accepting the model results or overriding the model results with a manual recommendation. In some embodiments, selection of the acceptance button can result in the generation of feedback that indicates the model output was accurate and correct, thus confirming the accuracy of the model output, while selection of the continue to manual review button can provide feedback that indicates the model recommendation was considered inaccurate by the reviewer. This feedback can optionally be used by the training component 508 to further tune and refine the model over time.

With reference again to FIG. 5, in addition to providing forecasted oxygen support data 120 and notification data 122, in some embodiments, the respiratory health monitoring component 501 can further include resource allocation component 510 to facilitate determining how to allocation oxygen support resources based on the forecasted oxygen support data 120. In particular, the forecasted oxygen support data 120 can provide a forecasted picture for a group of patients (e.g., all patients at the hospital, all respiratory illness patients, all patients in the ICU, etc.) regarding what oxygen support mechanisms they will need in the near future, including when they will need a new resource and no longer need a current resource. Based on this information, the resource allocation component 510 can know ahead of time, the upcoming supply and demand for different resources as well as the availability status of existing resources (e.g., what resources are available and when certain used reusable resources will become available for a new patient). The resource allocation component 510 can use this information to determine an optimal allocation of available oxygen resources to patients based on their forecasted needs. This allocation data, represented in FIG. 5 as resource allocation data 514, can be used to automatically assign resource to the patients. The resource allocation data 514 can also be provided to suitable entities (e.g., clinicians, care providers, resource technicians, etc.) in real-time via a display.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
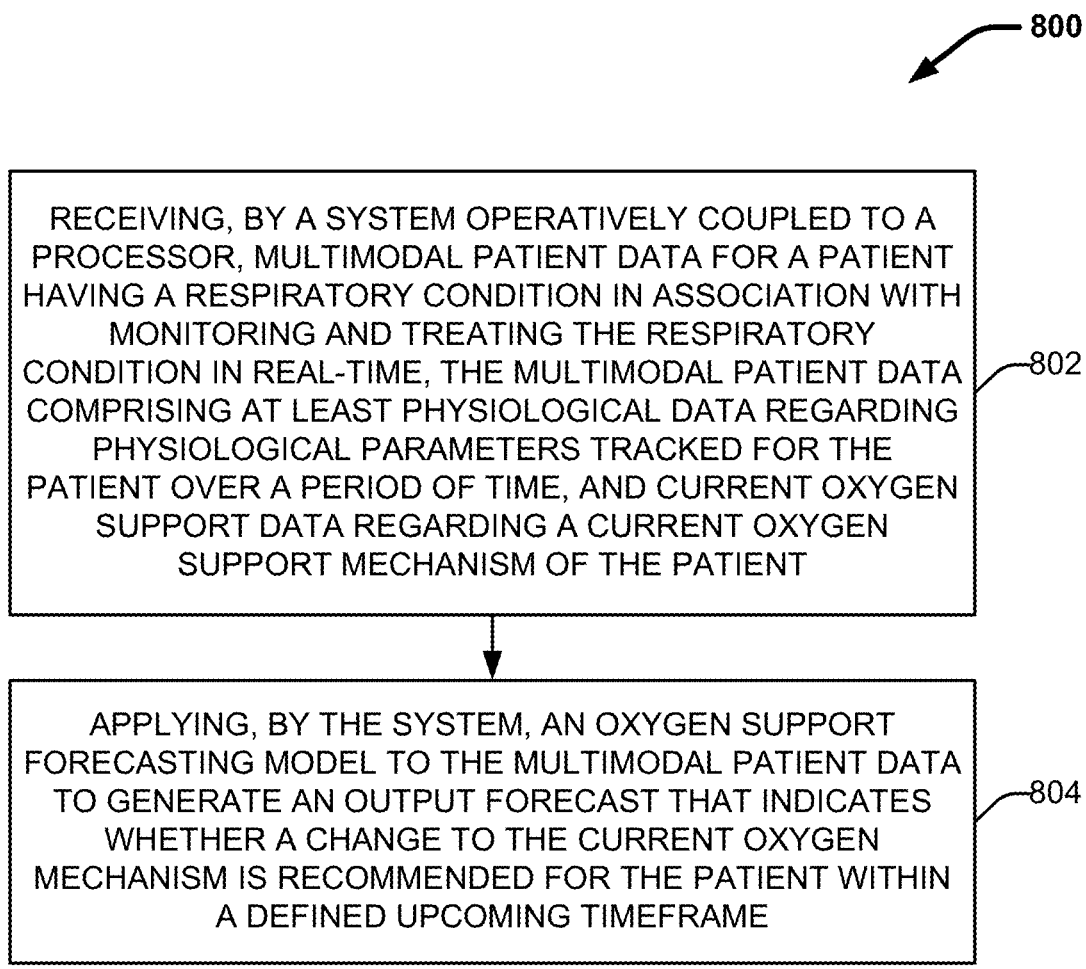
FIG. 8 depicts a high-level flow diagram of an example method for monitoring and predicting for short-term oxygen support needs in accordance with one or more embodiments described herein.

FIG. 8 depicts a high-level flow diagram of an example method 800 for monitoring and predicting for short-term oxygen support needs of patients in accordance with one or more embodiments described herein. In accordance with method 800, at 802, a system operatively coupled to a processor (e.g., respiratory health monitoring component 101, respiratory health monitoring component 501, and/or system 400) can receive (e.g., via data collection component 102) multimodal patient data (e.g., multimodal patient data 118) for a patient having a respiratory condition in association with monitoring and treating the respiratory condition in real-time, the multimodal patient data comprising at least physiological data regarding physiological parameters tracked for the patient over a period of time, and current oxygen support device data regarding a current oxygen support mechanism of the patient. At 804, the system can apply (e.g., via oxygen support forecasting component 110) an oxygen support forecasting model to the multimodal patient data to generate an output forecast (e.g., forecasted oxygen support data 120) that indicates whether a change to the current oxygen support mechanism is recommended for the patient within a defined upcoming timeframe.

Figure 9:
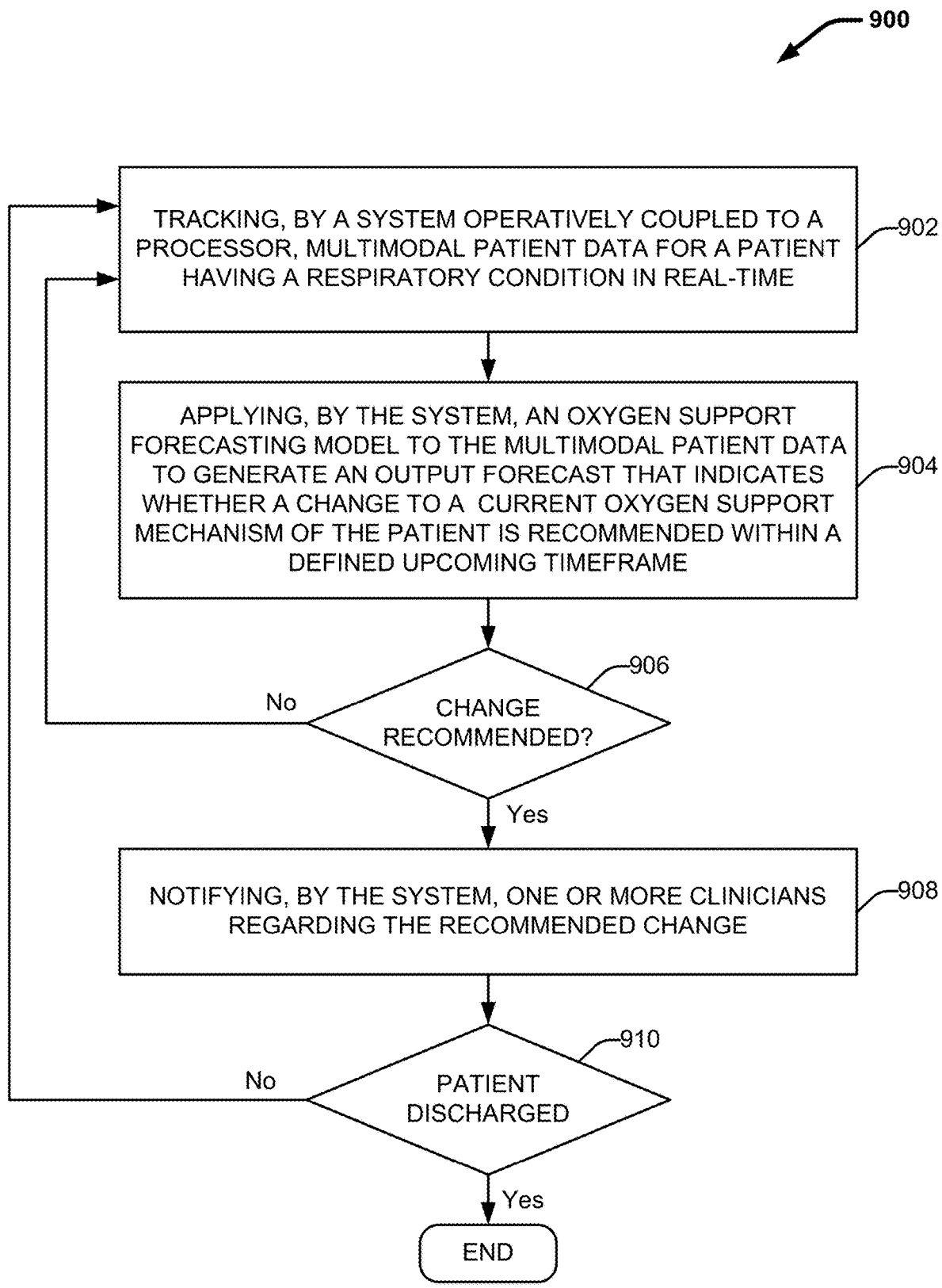
FIG. 9 depicts a high-level flow diagram of an example method for monitoring, predicting and alerting for short-term oxygen support needs in accordance with one or more embodiments described herein.

FIG. 9 depicts a high-level flow diagram of an example method 9000 for monitoring, predicting and notifying for short-term oxygen support needs of patients in accordance with one or more embodiments described herein. In accordance with method 900, at 902 a system operatively coupled to a processor (e.g., respiratory health monitoring component 101, respiratory health monitoring component 501, and/or system 400) can track (e.g., via tracking component 104) multimodal patient data (e.g., multimodal patient data 118) for a patient having a respiratory condition in association with monitoring and treating the respiratory condition in real-time. At 904, the system can apply (e.g., via oxygen support forecasting component 110) an oxygen support forecasting model to the multimodal patient data to generate an output forecast (e.g., forecasted oxygen support data 120) that indicates whether a change to the current oxygen support mechanism is recommended for the patient within a defined upcoming timeframe. At 906, if the model output indicates a change is not recommended (e.g., the model forecast recommends maintaining the current mechanism), then method 900 can return to 902 and continue tracking the patient. However, if a at 906 a change is recommended, then at 1008, the system can notify one or more clinicians regarding the recommended change. At 910, the if the patient has been discharged, the system can stop monitoring the patient and method 900 can end. However, if the patient has not been discharged, then method 900 can return to 902 and continue tracking the patient.

Figure 10:
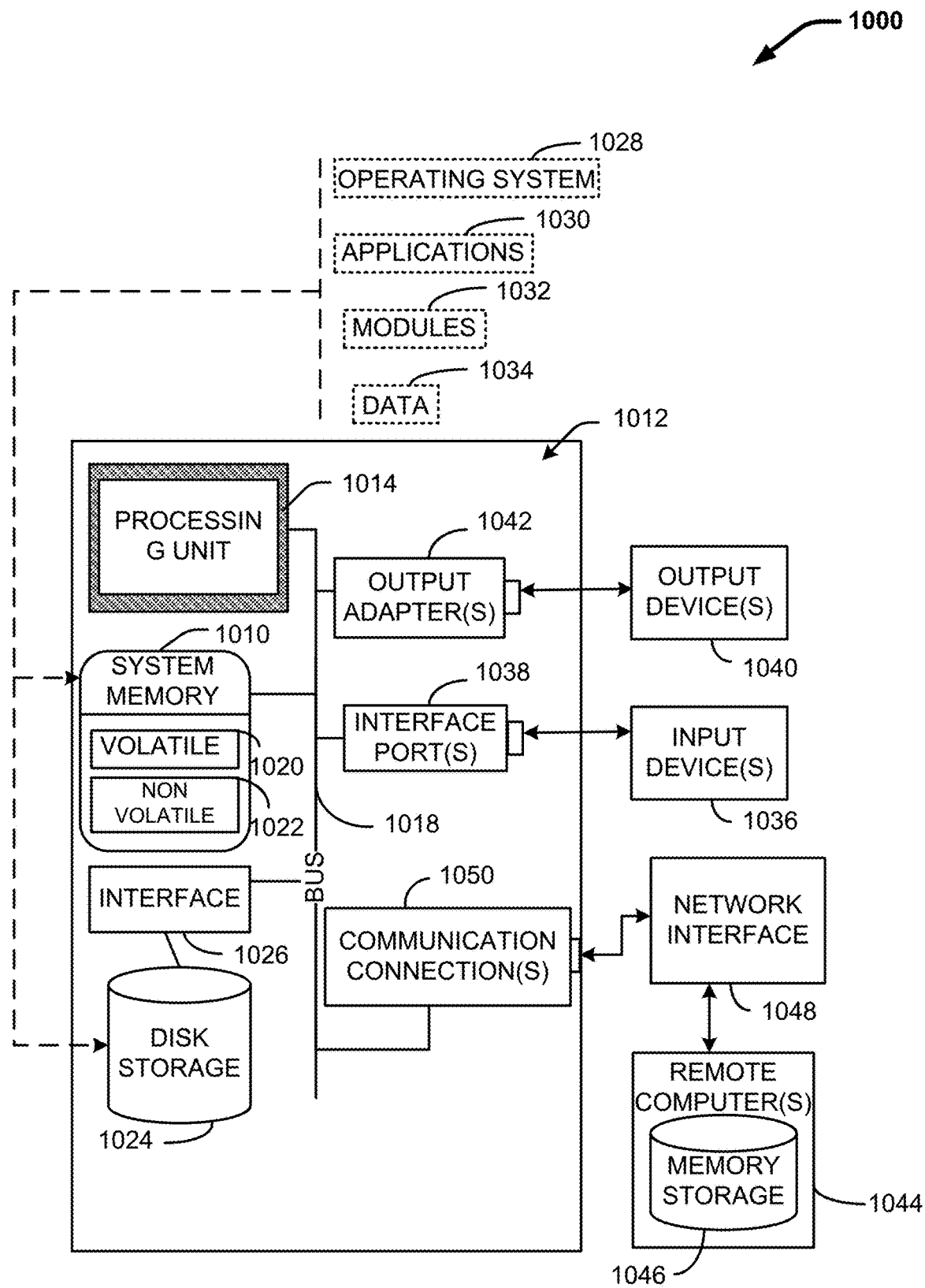
FIG. 10 is a schematic block diagram illustrating a suitable operating environment.
Figure 11:
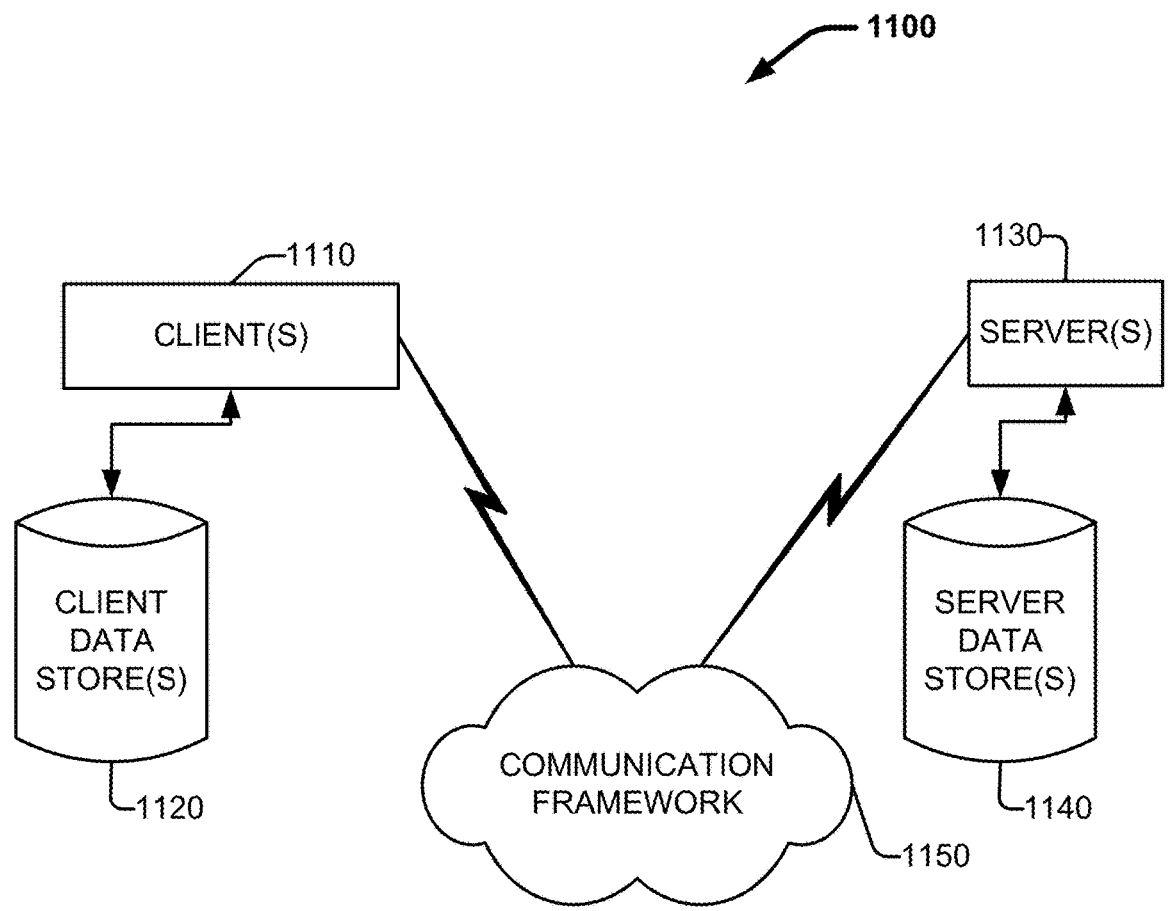
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

With reference to FIG. 10, a suitable environment 1000 for implementing various aspects of this disclosure includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory that stores computer executable components; and
   a processor that executes the computer executable components stored in the memory, wherein the computer executable components comprise:
      a data collection component that receives multimodal patient data for a patient having a respiratory condition in association with monitoring and treating the respiratory condition in real-time, the multimodal patient data comprising at least physiological data regarding physiological parameters tracked for the patient over a period of time, and current oxygen support data regarding a current oxygen support mechanism of the patient; and
      an oxygen support forecasting component that processes the multimodal patient data using an oxygen support forecasting model to generate an output forecast that indicates whether a change to the current oxygen support mechanism is recommended for the patient within a defined upcoming timeframe, wherein the change comprises a transition between different oxygen support device types in accordance with a predefined escalation or de-escalation hierarchy; select the oxygen support device recommended by the oxygen support forecasting model
      a resource allocation component that determines optimal oxygen resource allocation based at least in part on the output forecast and on forecasted oxygen demand across a plurality of patients within a healthcare facility; and
      and a respiratory health monitoring component that adjusts a flow rate of an oxygen support device selected according to the change, based on the determined oxygen resource allocation, by issuing a flow rate control signal to the oxygen support device.

2. The system of claim 1, wherein the data collection component receives the multimodal patient data in real-time over a course of care of the patient, and wherein the oxygen support forecasting component processes the multimodal patient data repeatedly over the course of care to repeatedly generate updated output forecasts.

3. The system of claim 1, wherein the computer executable components further comprise:
   a notification component that generates a notification regarding the output forecast and provides the notification to one or more clinician devices using one or more electronic notification means.

4. The system of claim 1, wherein the oxygen support device selected according to the change is selected from the group consisting of: an addition of an oxygen support device, a removal of an oxygen support device, a device type change to different type of oxygen support device, and a flow rate change to a flow rate of a current oxygen support device used by the patient.

5. The system of claim 1, wherein the output forecast indicates whether the current oxygen support mechanism should be maintained, upgraded, or downgraded.

6. The system of claim 5, wherein the computer executable components further comprise:
   a notification component that generates an urgent notification regarding the output forecast in response to the output forecast indicating the current oxygen support mechanism should be upgraded and provides the urgent notification to one or more clinician devices using one or more electronic notification means.

7. The system of claim 1, wherein the multimodal patient data further comprises patient demographic data and patient comorbidities data.

8. The system of claim 1, wherein the multimodal patient data further comprises patient laboratory results data and patient chest imaging study reports data.

9. The system of claim 1, wherein the oxygen support forecasting model comprises one or more machine learning models trained on historical patient data for past patients having the respiratory condition or a similar respiratory condition.

10. The system of claim 9, wherein the computer executable components further comprise:
    a training component that trains the oxygen support forecasting model to generate the output forecast based on the historical patient data using one or more machine learning techniques.

11. The system of claim 1, wherein the computer executable components further comprise:
    a rendering component that renders the patient data and the output forecast via a graphical user interface associated with a respiratory health monitoring application; and
    a feedback component that receives feedback via the respiratory health monitoring application regarding accuracy of the output forecast.

12. A method comprising:
    receiving, by a system operatively coupled to a processor, multimodal patient data for a patient having a respiratory condition in association with monitoring and treating the respiratory condition in real-time, the multimodal patient data comprising at least physiological data regarding physiological parameters tracked for the patient over a period of time, and current oxygen support device data regarding a current oxygen support mechanism of the patient; and applying, by the system, an oxygen support forecasting model to the multimodal patient data to generate an output forecast that indicates whether a change to the current oxygen support mechanism is recommended for the patient within a defined upcoming timeframe wherein the change comprises a transition between different oxygen support device types in accordance with a predefined escalation or de-escalation hierarchy; select the oxygen support device recommended by the oxygen support forecasting model receiving, by the system, resource allocation data comprising at least supply, demand, and availability of oxygen resources based on forecasted oxygen demand across a plurality of patients within a healthcare facility;

applying, by the system, a resource allocation model to the resource allocation data and multimodal patient data to determine an optimal allocation of oxygen resources; and Issuing, by the system, a flow rate control signal to the selected oxygen support device that causes the device to adjust a flow rate of oxygen.

13. The method of claim 12, wherein the receiving comprises receiving the multimodal patient data in real-time over a course of care of the patient, and wherein the applying comprises repeatedly applying the oxygen support forecasting model to the multimodal patient data as it is received over the course of care to repeatedly generate updated output forecasts.

14. The method of claim 12, further comprising:
   generating, by the system, a notification regarding the output forecast; and
   providing, by the system, the notification to one or more clinician devices using one or more electronic notification means.

15. The method of claim 12, wherein the oxygen support device selected according to the change is selected from the group consisting of: an addition of an oxygen support device, a removal of an oxygen support device, a device type change to different type of oxygen support device, and a flow rate change to a flow rate of a current oxygen support device used by the patient.

16. The method of claim 12, wherein the output forecast indicates whether the current oxygen support mechanism should be maintained, upgraded, or downgraded.

17. The method of claim 12, wherein the multimodal patient data further comprises patient demographic data, patient comorbidities data, patient laboratory results data and patient chest imaging study reports data.

18. The method of claim 12, wherein the oxygen support forecasting model comprises one or more machine learning models trained on historical patient data for past patients having the respiratory condition or a similar respiratory condition, and wherein the method further comprises:
   training, by the system, the oxygen support forecasting model to generate the output forecast based on the historical patient data using one or more machine learning techniques.

19. A non-transitory computer readable storage medium, comprising executable instructions that, when executed by a processor, facilitate performance of operations, comprising:
   receiving multimodal patient data for a patient having a respiratory condition in association with monitoring and treating the respiratory condition in real-time, the multimodal patient data comprising at least physiological data regarding physiological parameters tracked for the patient over a period of time, and current oxygen support data regarding a current oxygen support mechanism of the patient; and
   forecasting whether a change to the current oxygen support mechanism is recommended for the patient within a defined upcoming timeframe based on the multimodal patient data using an oxygen support forecasting model that comprises one or more machine learning models trained on historical patient data for past patients having the respiratory condition or a similar respiratory condition, wherein the change comprises a transition between different oxygen support device types in accordance with a predefined escalation or de-escalation hierarchy; select the oxygen support device recommended by the oxygen support forecasting model
   receiving resource allocation data comprising at least supply, demand, and availability of oxygen resources;
   determining an optimal allocation of oxygen resources based on forecasted oxygen demand across a plurality of patients within a healthcare facility; and
   issuing a flow rate control signal to the selected oxygen support device that causes the device to adjust a flow rate of oxygen.

20. The non-transitory computer readable storage medium of claim 19, wherein the operations further comprise:
   generating a notification regarding the output forecast; and
   providing the notification to one or more clinician devices using one or more electronic notification means.

* * * * *